US009505879B2

(12) United States Patent
Harumashi et al.

(10) Patent No.: US 9,505,879 B2
(45) Date of Patent: Nov. 29, 2016

(54) POLYMER HAVING TERMINAL STRUCTURE INCLUDING PLURALITY OF REACTIVE SILICON GROUPS, METHOD FOR MANUFACTURING SAME, AND USE FOR SAME

(71) Applicant: KANEKA CORPORATION, Osaka-shi, Osaka (JP)

(72) Inventors: Tatsuro Harumashi, Takasago (JP); Akio Taniguchi, Osaka (JP); Hidetoshi Odaka, Takasago (JP); Katsuyu Wakabayashi, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/404,112

(22) PCT Filed: May 30, 2013

(86) PCT No.: PCT/JP2013/064982
§ 371 (c)(1),
(2) Date: Nov. 26, 2014

(87) PCT Pub. No.: WO2013/180203
PCT Pub. Date: Dec. 5, 2013

(65) Prior Publication Data
US 2015/0133622 A1    May 14, 2015

(30) Foreign Application Priority Data

May 31, 2012   (JP) ................. 2012-124290
May 31, 2012   (JP) ................. 2012-124291

(51) Int. Cl.
| | | |
|---|---|---|
| C08G 77/18 | (2006.01) | |
| C08G 65/331 | (2006.01) | |
| C08G 65/336 | (2006.01) | |
| C08L 71/02 | (2006.01) | |
| C08L 83/04 | (2006.01) | |
| C08L 43/04 | (2006.01) | |
| C09J 143/04 | (2006.01) | |
| C08G 77/38 | (2006.01) | |

(52) U.S. Cl.
CPC ............ C08G 65/331 (2013.01); C08G 65/336 (2013.01); C08G 77/38 (2013.01); C08L 43/04 (2013.01); C08L 71/02 (2013.01); C08L 83/04 (2013.01); C09J 143/04 (2013.01); C08G 2650/58 (2013.01)

(58) Field of Classification Search
CPC ...... C08G 77/38; C08G 77/18; C08G 77/16; C08G 65/331; C08G 65/336
See application file for complete search history.

(56) References Cited

U.S. PATENT DOCUMENTS

| | | | |
|---|---|---|---|
| 3,278,457 A | 10/1966 | Milgrom | |
| 3,278,458 A | 10/1966 | Belner | |
| 3,278,459 A | 10/1966 | Herold | |
| 3,404,109 A | 10/1968 | Milgrom | |
| 3,427,256 A | 2/1969 | Milgrom | |
| 3,427,334 A | 2/1969 | Belner | |
| 3,427,335 A | 2/1969 | Herold | |
| 3,931,287 A | 1/1976 | Kehr et al. | |
| 4,355,188 A | 10/1982 | Herold et al. | |
| 4,774,356 A | 9/1988 | Inoue et al. | |
| 4,786,667 A | 11/1988 | Shimizu et al. | |
| 5,177,156 A * | 1/1993 | Aritomi ............... | C08G 65/485 525/100 |
| 6,035,172 A * | 3/2000 | Mimura ............. | G03G 15/0818 399/286 |
| 6,437,071 B1 | 8/2002 | Odaka et al. | |
| 7,067,563 B2 * | 6/2006 | Klein ........................ | C08F 8/42 521/154 |
| 2008/0241892 A1 | 10/2008 | Roitman et al. | |
| 2009/0087635 A1 * | 4/2009 | Yano .................... | C08G 59/504 428/220 |
| 2013/0034514 A1 * | 2/2013 | Schweinsberg .......... | A61K 8/86 424/70.12 |

FOREIGN PATENT DOCUMENTS

| | | |
|---|---|---|
| EP | 1621568 A1 | 2/2006 |
| EP | 2289997 A1 | 3/2011 |
| EP | 2682432 A1 | 1/2014 |
| JP | 46-27250 | 8/1971 |
| JP | 47-3269 | 1/1972 |
| JP | 50-156599 A | 12/1975 |
| JP | 52-73998 A | 6/1977 |
| JP | 58-132022 | 8/1983 |
| JP | 59-15336 B2 | 4/1984 |
| JP | 60-006747 A | 1/1985 |
| JP | 61-215623 A | 9/1986 |
| JP | 62-283123 A | 12/1987 |
| JP | 03-79627 A | 4/1991 |
| JP | 10-273512 A | 10/1998 |
| JP | 11-60722 A | 3/1999 |

(Continued)

OTHER PUBLICATIONS

Notification of Transmittal of Translation of the International Preliminary Report on Patentability of International Patent Application No. PCT/JP2013/064982 (form PCT/IB/338), mailing date of Dec. 11, 2014 with forms PCT/IB/373 and PCT/ISA/237. (8 pages).

(Continued)

*Primary Examiner* — Margaret Moore
(74) *Attorney, Agent, or Firm* — Westerman, Hattori, Daniels & Adrian, LLP

(57) ABSTRACT

A polymer (A) having, at one terminal moiety thereof, a terminal structure having two or more carbon-carbon unsaturated bonds. A reactive-silicon-group-containing polymer (B) having, at one terminal moiety thereof, a terminal structure having two or more reactive silicon groups.

4 Claims, No Drawings

(56) References Cited

FOREIGN PATENT DOCUMENTS

| JP | 2866181 B2 | 3/1999 |
| JP | 2000-129126 A | 5/2000 |
| JP | 2000-327902 A | 11/2000 |
| JP | 2001-55438 A | 2/2001 |
| WO | 2012/020560 A1 | 2/2012 |

OTHER PUBLICATIONS

Irina A. Gorodetskaya, et al., "Functionalized Hyperbranched Polymers via Olefin Metathesis", Macromolecules, 2009, 42, pp. 2895-2898.
Extended European Search Reported issued May 13, 2016 in counterpart European Patent Application No. 13796979 (12 pages).

* cited by examiner

POLYMER HAVING TERMINAL STRUCTURE INCLUDING PLURALITY OF REACTIVE SILICON GROUPS, METHOD FOR MANUFACTURING SAME, AND USE FOR SAME

TECHNICAL FIELD

The present invention relates to a novel reactive-group-containing polymer useful, in particular, for an adhesive and others; a method for manufacturing the polymer; and a composition containing the polymer.

BACKGROUND ART

About a polymer having, in the molecule thereof, a carbon-carbon unsaturated bond, its molecular chain can be extended or a crosslinkage network can be formed therein, using an ene/thiol addition reaction with a thiol compound or a hydrosilylation reaction with a hydrosilane compound. Making use of this property, the polymer is used as a raw material of adhesive compositions or curable compositions (Patent Documents 1 and 2). When the polymer is used as the raw material of these curable compositions, an unsaturated bond is generally introduced into a terminal of the molecular chain.

Such a reactive-silicon-group-containing polymer, which is obtained by causing a hydrolyzable-group-containing hydrosilane to hydrosilylate with a carbon-carbon unsaturated bond, is also known as a moisture-reactive polymer. The polymer is included in many industrial products, such as adhesives, sealing agents, coating agents, paints, and tackifiers, and is used in various fields (Patent Document 3).

As a polymer component of such a reactive-group-containing polymer, various polymers are known, examples of which include polymers each having, as a main skeleton thereof, a polyoxyalkylene, saturated hydrocarbon based polymer, or (meth)acrylate copolymer. Out of such polymers, a polyoxyalkylene polymer has a wide applicable scope since the polymer has, for example, the following characteristics: the polymer is relatively low in viscosity at room temperature to be easily handled; and a cured product obtained after reaction of this polymer also shows a good elasticity.

Physical properties of cured products and others that are obtained using a polymer having reactive groups are affected by the structure of the polymer, and the respective positions and the number of the reactive groups. In particular, about the elasticity and the strength of the cured products, factors such as the crosslinkage density or the between-crosslinking-point molecular weight largely affect such physical properties. The polymer needs to have an appropriate between-crosslinking-point molecular weight to gain elasticity. As the polymer is higher in crosslinkage density, the resultant cured product tends to be stronger. In order to gain a cured product having an excellent strength, it is effective to make molecules of the polymer uniform into some degree in between-crosslinking-point molecular weight. In other words, it is preferred that respective chains of the molecules have, at their terminals, reactive groups. Additionally, in order to make the molecules high in crosslinkage density, the reactive groups need to be efficiently present at the terminals.

Any polyoxyalkylene polymer is generally obtained through a polymerization in which an epoxy compound is subjected to ring-opening polymerization. The polymer is obtained by, for example, a polymerization using an alkali catalyst such as KOH, a polymerization using a transition-metal-compound/porphyrin complex catalyst, which is obtained by causing an organic aluminum compound to react with porphyrin (Patent Document 4), a polymerization using a composite metal-cyanide-complex catalyst (Patent Documents 5 to 12), a polymerization using a catalyst made of a polyphosphazene salt (Patent Document 13), or a polymerization using a catalyst made of a phosphazene compound (Patent Document 14).

A polyoxyalkylene polymer having, at its terminal, a hydroxyl group is obtained by a method as described above. By modifying the terminal group of this hydroxyl-group-terminated polyoxyalkylene, a polyoxyalkylene polymer having carbon-carbon unsaturated bonds can be obtained. As an example of the modification, the following is disclosed: a method of using an alkali metal salt to substitute the hydroxyl group with an alkoxy group, and then causing the resultant compound to react with an unsaturated-group-containing halide such as allyl chloride (Patent Document 15); or a method of causing the hydroxyl terminal of the polymer to react with an isocyanate compound having a carbon-carbon unsaturated bond (Patent Document 16).

Disclosed are also methods of using a composite cyanide complex as a catalyst to polymerize an epoxide monomer containing no carbon-carbon unsaturated bond, and subsequently copolymerizing the epoxide monomer containing no carbon-carbon unsaturated bond with an epoxide monomer containing a carbon-carbon unsaturated bond (Patent Documents 17 and 18).

PRIOR ART DOCUMENTS

Patent Documents

Patent Document 1: JP-B-47-3269
Patent Document 2: Japanese Patent No. 2866181
Patent Document 3: Japanese Patent No. 1801280
Patent Document 4: JP-A-61-215623
Patent Document 5: JP-B-46-27250
Patent Document 6: JP-B-59-15336
Patent Document 7: U.S. Pat. No. 3,278,457
Patent Document 8: U.S. Pat. No. 3,278,458
Patent Document 9: U.S. Pat. No. 3,278,459
Patent Document 10: U.S. Pat. No. 3,427,256
Patent Document 11: U.S. Pat. No. 3,427,334
Patent Document 12: U.S. Pat. No. 3,427,335
Patent Document 13: JP-A-10-273512
Patent Document 14: JP-A-11060722
Patent Document 15: JP-A-52-73998
Patent Document 16: JP-A-50-156599
Patent Document 17: JP-A-03-79627
Patent Document 18: JP-A-2001-55438

SUMMARY OF THE INVENTION

Problems to be Solved by the Invention

An object of the present invention is to introduce, more effectively into a polyoxyalkylene polymer, a larger proportion of reactive groups, such as carbon-carbon unsaturated bonds or reactive silicon groups, at a terminal of the polymer, thereby providing a polymer which is a raw material of a cured product having an excellent elasticity and strength; a method for manufacturing the polymer under industrially favorable conditions; and a composition including the polymer.

In the case of using a conventional method as disclosed in Patent Document 15 or 16, a carbon-carbon unsaturated bond or carbon-carbon unsaturated bonds introducible into one hydroxyl terminal that a polyoxyalkylene polymer contains are at most one in number. In the case of introducing reactive silyl groups further thereinto by, for example, hydrosilylation, there remains a problem that the quantity on average of the silyl groups introduced per terminal of the polymer is lowered in proportion.

In the case of using the method described in Patent Document 17 or 18, the polymerization for the main chain of the polymer competes with the introduction of the reactive groups. Thus, it is difficult to control the molecular weight and the proportion of introduced functional groups uniformly. As a method for introducing reactive silicon groups into a terminal (of such a polymer), known is a method of copolymerization with a reactive-silicon-group-containing epoxy compound, using a method in JP-A-2010-77432. However, this case has a problem about the removal of a catalyst for the polymerization, and a problem that the resultant polymer is easily lowered in stability.

Means for Solving the Problems

The inventors have made eager investigations to solve the problems. As a result, the inventors have achieved an invention described below.

Thus, the present invention relates to the following:

(1). A polymer (A) having, at one terminal moiety thereof, a terminal structure having two or more carbon-carbon unsaturated bonds, (2). The polymer (A) according to item (1), wherein the terminal moiety has a structure represented by the following general formula (1):

[Formula 2]

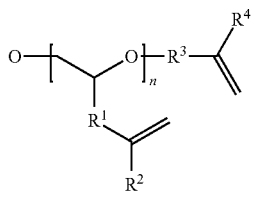
(1)

In the formula, $R^1$ and $R^3$ are each independently a bivalent bonding group having 1 to 6 carbon atoms and an atom of the bonding group that is bonded to any carbon atom adjacent to the bonding group is any one of carbon, oxygen and nitrogen; $R^2$ and $R^4$ are each independently hydrogen, or a hydrocarbon group having 1 to 10 carbon atoms; and n is an integer of 1 to 10, (3). The polymer (A) according to item (1) or (2), wherein a hydroxyl group or hydroxyl groups contained are 0.3 or less in number on average per molecule of the polymer (A), (4). The polymer (A) according to any one of items (1) to (3), having a main skeleton which is a polyoxyalkylene polymer, (5). A method for manufacturing the polymer (A) recited in any one of items (1) to (4), comprising: causing an alkali metal salt to act onto a polymer having, at a terminal thereof, a hydroxyl group in an amount of 0.6 equivalent or more relative to the hydroxyl group amount in the polymer; causing the resultant to react with an epoxy compound having a carbon-carbon unsaturated bond; and further causing the resultant to react with a halogenated hydrocarbon compound having a carbon-carbon unsaturated bond, (6). The method for manufacturing the polymer (A) according to item (5), wherein the alkali metal salt is a sodium alkoxide, the epoxy compound, which has a carbon-carbon unsaturated bond, is allyl glycidyl ether or methallyl glycidyl ether, and the halogenated hydrocarbon compound, which has a carbon-carbon unsaturated bond, is allyl chloride or methallyl chloride, (7). A reactive-silicon-group-containing polymer (B) having, at one terminal moiety thereof, a terminal structure having two or more reactive silicon groups, (8). A reactive-silicon-group-containing polymer (B), having reactive silicon groups which are 1.1 or more in number on average per terminal of the polymer, (9). A reactive-silicon-group-containing polymer (B), obtained by introducing one or more reactive silicon groups into unsaturated bonds of the polymer (A) according to any one of items 1 to 4 by hydrosilylation reaction, (10). A method for manufacturing a reactive-silicon-group-containing polymer (B), comprising: introducing one or more reactive silicon groups into unsaturated bonds of the polymer (A) according to any one of items (1) to (4) by hydrosilylation reaction, (11). A curing composition, comprising the polymer (A) recited in any one of items (1) to (4), (12). A composition, comprising the polymer (B) recited in any one of items (7) to (9), (13). The curable composition according to item (12), comprising, as the polymer (B), a reactive-silicon-group-containing polymer (B1) in which a main chain skeleton is a polyoxyalkylene polymer, and further comprising a (meth)acrylate polymer (C) having one or more reactive silicon groups, (14). The curable composition according to item (13), wherein the reactive silicon group(s) of the polymer (C) is/are (each) a reactive silicon group (b3) represented by the following general formula (4):

$$—SiR^5{}_{3-a}Y_a \qquad (4)$$

wherein $R^5$(s) is/are (each independently) a substituted or unsubstituted hydrocarbon group having 1 to 20 carbon atoms, Y is/are (each) a hydroxyl group or a hydrolyzable group, and a is any one of 1, 2 and 3 provided that a is 3 herein.

(15). The curable composition according to item (13) or (14), comprising, as the polymer (B1), a polyoxyalkylene polymer having both species of one or more reactive silicon groups (b2) which is/are (each) represented by the general formula (4) in which a is 2, and one or more reactive silicon groups (b3) which is/are (each) represented by the general formula (4) in which a is 3; and/or a polyoxyalkylene polymer having the reactive silicon group(s) (b2) and a polyoxyalkylene polymer having the reactive silicon group(s) (b3), (16). The curable composition according to item (15), wherein the reactive silicon group(s) (b2) is/are (each) a methyldimethoxysilyl group, and the reactive silicon group(s) (b3) is/are (each) a trimethoxysilyl group, (17). The curable composition according to any one of items (14) to (16), wherein the polymer (C) has trimethoxysilyl groups which are 1.27 or more in number on average per molecule of the polymer (C), (18). The curable composition according to item (12), further comprising a polymer (D) having a reactive silicon group or reactive silicon groups which are 0.5 or more and less than 1.2 in number on average per molecule of the polymer (D), (19). The curable composition according to item (18), wherein the polymer (B) has a number-average molecular weight of 10000 or more and less than 35000, and the polymer (D) has a number-average molecular weight of 3000 or more and less than 10000, and (20). The curable composition according to any one of items (12) to (19), further comprising an organopolysiloxane polymer (F) having a reactive silicon group.

Effect of the Invention

The manufacturing method of the present invention makes it possible to manufacture effectively a polymer which has, at one terminal moiety thereof, a terminal structure having two or more reactive groups through an industrially favorable process, and which is a raw material of a cured product excellent in handleability and excellent in strength and elasticity. Moreover, a curable composition using the resultant polymer gives a cured product excellent in mechanical strength, restorability and weather resistance.

MODE FOR CARRYING OUT THE INVENTION

Hereinafter, the present invention will be described in detail.

The "terminal moiety" in the present invention includes a chain terminal of a polymeric molecular chain, and a structure in the vicinity thereof. More specifically, the wording may be defined as a group (or radical) substituted on atoms in a range extending from a terminal of a polymeric molecular chain and containing atoms the number of which is 20%, preferably 10% of the number of bonded atoms constituting the polymeric molecular chain. When represented by the number of bonded atoms, the terminal moiety may be defined as atoms in a range from a terminal atom of a polymeric molecular chain to a $30^{th}$ atom, more preferably a $20^{th}$ atom, in particular preferably a $10^{th}$ atom from the terminal atom.

About any polymer having, at a terminal of a polymeric chain thereof, a reactive group, such as a carbon-carbon unsaturated bond or reactive silicon group, the polymeric chain can be extended or a crosslinkage network can be constructed therein by making use of a reaction of the reactive group. Such a polymer makes use of this property to be changed in natures, thereby exhibiting an adhesive performance, or to form a rubbery cured product. Thus, the polymer is used for many purposes. At this time, the presence of the reactive group at a terminal of the polymeric chain is favorable, which has been known. In order to supply an adhesive performance (to such a polymer) by extending the polymeric chain thereof, the presence of the reactive group at the terminal effectively attains the extension of the molecular chain. Moreover, according to the three-dimensional linkage, the polymer can ensure a between-crosslinking-point molecular weight, also at the time of yielding a cured product, by the presence of the reactive group at the molecular chain terminal. Thus, characteristics of the structure of the polymeric main chain are reflected onto physical properties of the cured product so that the cured product can become strong. Any ordinarily known reactive-group-containing polymer is generally a polymer having, at each terminal moiety, a single reactive group. When such a reactive-group-containing polymer is used to aim at a physical-property-supply as described above, which makes use of terminal-group-reaction, a defect is generated in the chain extension or the three-dimensional crosslinkage unless the reaction efficiency is 100%. As a result, expected properties may not be obtained.

Thus, the present inventors have invented a reactive-group-containing polymer described below.

The polymer (A) of the present invention is a polymer having, at one terminal moiety thereof, a terminal structure having two or more carbon-carbon unsaturated bonds.

The number of terminal structures which are contained in each molecule of the polymer (A) and which each have two or more carbon-carbon unsaturated bonds is preferably 0.5 or more, more preferably 1.0 or more, even more preferably 1.1 or more, most preferably 1.5 or more on average. The upper limit thereof is preferably 4 or less, more preferably 3 or less. It is preferred that the polymer (A) hardly has, at any moiety other than its terminal moieties, carbon-carbon unsaturated bonds. Even when the polymer (A) has one or more carbon-carbon unsaturated bonds thereat, the number thereof is preferably 2 or less. In particular preferably, the polymer (A) does not substantially have any carbon-carbon unsaturated bond thereat.

As far as the polymer (A) has, at one terminal moiety thereof, two or more carbon-carbon unsaturated bonds, the polymer (A) may have, at a different terminal moiety thereof, a terminal structure having less than 2 carbon-carbon unsaturated bonds.

The terminal structure of the polymer (A) having two or more carbon-carbon unsaturated bonds is represented by the following general formula (1):

[Formula 3]

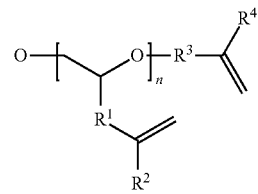

In the formula, $R^1$ and $R^3$ are each independently a bivalent bonding group having 1 to 6 carbon atoms and an atom of the bonding group that is bonded to any carbon atom adjacent to the bonding group is any one of carbon, oxygen and nitrogen; $R^2$ and $R^4$ are each independently hydrogen, or a hydrocarbon group having 1 to 10 carbon atoms; and n is an integer of 1 to 10, preferably 1 or 2. A specific example of the carbon-carbon unsaturated bond is preferably an allyl group structure or a methallyl group structure since the introduction of the structure is easy. However, the carbon-carbon unsaturated bond is not limited thereto.

Examples of $R^1$ include $CH_2OCH_2$, $CH_2O$, $CH_2$ and the like.

Examples of $R^2$ include a hydrogen atom, methyl and ethyl groups and the like.

Examples of $R^3$ include $CH_2$, $CH_2CH_2$ and the like.

Examples of $R^4$ include a hydrogen atom, methyl and ethyl groups and the like.

The polymer (A) has carbon-carbon unsaturated bonds which are preferably from 1.1 to 5 both inclusive in number, more preferably from 1.2 to 3 both inclusive in number, even more preferably from 1.5 to 2.5 both inclusive in number, in particular preferably from 1.7 to 2.5 both inclusive in number on average per terminal moiety of the polymer (A).

The number-average molecular weight of the polymer (A) is preferably from about 3,000 to 100,000, more preferably from 3,000 to 50,000, in particular preferably from 3,000 to 30,000 in terms of that of polystyrene through GPC. If the number-average molecular weight is less than 3,000, the proportion of introduced reactive silicon groups results in being large so that an inconvenience may be caused for production costs. If the number-average molecular weight is more than 100,000, the polymer (A) is high in viscosity to tend to be deteriorated in workability.

The molecular weight distribution (Mw/Mn) of the polymer (A) is not particularly limited. The distribution is preferably narrow to be less than 2.0, and is more preferably 1.6 or less, even more preferably 1.5 or less, in particular preferably 1.4 or less, or 1.2 or less.

The main chain structure of the polymer (A) may be linear, or may have a branched chain. Since the polymer (A) of the present invention is characterized in that reactive groups are caused to be localized at its terminal(s), the main chain structure is preferably linear.

The skeleton of the main chain of the polymer (A) is not particularly limited, and may be a main chain skeleton that may be of various types. Examples thereof include polyoxyalkylene polymers such as polyoxyethylene, polyoxypropylene, polyoxybutylene, polyoxytetramethylene, polyoxyethylene-polyoxypropylene copolymer, and polyoxypropylene-polyoxybutylene copolymer; hydrocarbon polymers such as ethylene-propylene copolymer, polyisobutylene, a copolymer made from isobutylene, and isoprene or some other, polychloroprene, polyisoprene, a copolymer made from isoprene or butadiene, acrylonitrile and/or styrene or some other, polybutadiene, and a copolymer made from isoprene or butadiene, acrylonitrile, and styrene or some other, and hydrogenated polyolefin polymers each obtained by hydrogenating any one of these polyolefin polymers; polyester polymers each obtained by condensing a dibasic acid such as adipic acid, and glycol, or causing a lactone to undergo ring-opening polymerization; (meth)acrylate polymers each obtained by radical-polymerizing a monomer such as ethyl (meth)acrylate or butyl (meth)acrylate; vinyl polymers each obtained by radical-polymerizing a monomer such as a (meth)acrylate monomer, vinyl acetate, acrylonitrile, or styrene; graft polymers each obtained by polymerizing a vinyl monomer in any one of these polymers; polysulfide polymers; polyamide polymers such as polyamide 6 obtainable by the ring-opening polymerization of ϵ-caprolactam, polyamide 6,6 obtainable by the polycondensation of hexamethylenediamine and adipic acid, polyamide 6,10 obtainable by the polycondensation of hexamethylenediamine and sebacic acid, polyamide 11 obtainable by the polycondensation of ϵ-aminoundecanoic acid, polyamide 12 obtainable by the ring-opening polymerization of ϵ-aminolaurolactam, and copolymerized polyamides each having two or more components of these polyamides; and organic polymers such as polycarbonate polymer produced by poly-condensing bisphenol A and carbonyl chloride, and dially phthalate polymers. These polymers may each be in a mixed form of two or more of a block form, a graft form and other forms. Of these examples, preferred are saturated hydrocarbon polymers such as polyisobutylene, hydrogenated polyisoprene and hydrogenated polybutadiene, polyoxyalkylene polymers, and (meth)acrylate polymers since these polymers are relatively low in glass transition temperature and respective cured products obtained from the polymers are excellent in cold resistance.

The polymer (A) may have any one of the above-mentioned various main chain skeletons, or may be a mixture of polymers having different ones of the main chain skeletons. The mixture may be a mixture obtained by producing its polymers separately from each other and then mixing the polymers with each other, or a mixture obtained by producing its components simultaneously into any mixture composition.

The glass transition temperature of the polymer (A) is not particularly limited. The glass transition temperature is preferably 20° C. or lower, more preferably 0° C. or lower, in particular preferably −20° C. or lower. If the glass transition temperature is higher than 20° C., the polymer (A) may become high in viscosity in winter or in cold districts to be difficult to handle. Moreover, the resultant cured product may be lowered in flexibility to be declined in elongation. The glass transition temperature can be obtained by DSC measurement in accordance with a measuring method prescribed in JIS K 7121.

The saturated hydrocarbon polymers, the polyoxyalkylene polymers, the (meth)acrylate polymers and other organic polymers are preferred since when the polymers are each used as a base polymer for an adhesive or sealing material, there is rarely caused a pollution based on, for example, the shift of low molecular weight components therein onto an adherend.

The polyoxyalkylene polymers and the (meth)acrylate polymers are preferred since the polymers are high in moisture permeability and adhesiveness, and are excellent in depth curability when made into a one-pack type composition. The polyoxyalkylene polymers are particularly preferred.

The polyoxyalkylene polymers are each a polymer having repeating units each represented by $—R^7—O—$ wherein $R^7$ is a linear or branched alkylene group having 1 to 14 carbon atoms. $R^7$ is more preferably a linear or branched alkylene group having 2 to 4 carbon atoms. Specific examples of the repeating unit represented by $—R^5—O—$ include $—CH_2O—$, $—CH_2CH_2O—$, $—CH_2CH(CH_3)O—$, $—CH_2CH(C_2H_5)O—$, $—CH_2C(CH_3)(CH_3)O—$, and $—CH_2CH_2CH_2CH_2O—$. The main chain structure of each of the polyoxyalkylene polymers may be made of only one repeating unit species, or two or more repeating unit species. When the polymer (A) is used, in particular, as a sealant, an adhesive or the like, the polyoxyalkylene polymer is preferably a polymer comprising a polyoxypropylene polymer in which the proportion of repeating units of oxypropylene is 50% or more by weight, preferably 80% or more by weight of the main chain structure of the polymer since the polymer is amorphous and is relatively low in viscosity.

The polyoxyalkylene polymer is preferably a polymer obtained by the ring-opening polymerization reaction of a cyclic ether compound in the presence of an initiator, using a polymerization catalyst.

Examples of the cyclic ether compound include ethylene oxide, propylene oxide, butylene oxide, tetramethylene oxide, and tetrahydrofuran. These cyclic ether compounds may be used alone or in any combination of two or more thereof. It is preferred to use, out of these cyclic ether compounds, in particular, propylene oxide since a polyether polymer amorphous and relatively low in viscosity can be obtained therefrom.

Specific examples of the initiator include alcohols such as ethylene glycol, propylene glycol, butanediol, hexamethylene glycol, neopentyl glycol, diethylene glycol, dipropylene glycol, triethylene glycol, glycerin, trimethylolmethane, trimethylolpropane, pentaerythritol, and sorbitol; and polyoxyalkylene polymers each having a number-average molecular weight of 300 to 4,000, such as polyoxypropylene diol, polyoxypropylene triol, polyoxyethylene diol, and polyoxyethylene triol.

The polymerization method for the polyoxyalkylene polymer is not particularly limited, and may be, for example, a polymerization using an alkali catalyst such as KOH, a polymerization disclosed in JP-A-61-215623, using a transition-metal-compound/porphyrin complex catalyst, which is obtained by causing an organic aluminum compound to react with porphyrin, a polymerization disclosed in each of JP-B-46-27250, JP-B-59-15336, U.S. Pat. No. 3,278,457, U.S. Pat. No. 3,278,458, U.S. Pat. No. 3,278,459, U.S. Pat. No. 3,427,256, U.S. Pat. No. 3,427,334, U.S. Pat. No. 3,427,335, and other publications, using a composite metal-cyanide-complex catalyst, a polymerization disclosed in JP-A-10-273512, using a catalyst made of a polyphosphazene salt, or a polymerization disclosed in JP-A-11060722, using a catalyst made of a phosphazene compound.

The above-mentioned saturated hydrocarbon polymers are each a polymer which does not substantially have any carbon-carbon unsaturated bond other than such bonds in an aromatic ring. A polymer constituting its skeleton can be obtained by, for example, a method (1) of polymerizing an olefin compound having 2 to 6 carbon atoms, such as ethylene, propylene, 1-butene or isobutylene, as a main monomer, or a method (2) of homo-polymerizing a diene compound such as butadiene or isoprene, or copolymerizing the diene compound with the olefin compound, and then hydrogenating the resultant copolymer. Of these saturated hydrocarbon polymers, any isobutylene polymer or hydrogenated polybutadiene polymer is preferred since a functional group is easily introduced into its terminal(s), the molecular weight thereof is easily controllable, and further the number of its terminated functional groups can be increased. The isobutylene polymer is more preferred.

A polymer having a main chain skeleton that is a saturated hydrocarbon polymer has features of being excellent in heat resistance, weather resistance, endurance and moisture blocking performance.

The isobutylene polymer may be a polymer in which all repeating units are each an isobutylene unit, or a copolymer composed of isobutylene units and other repeating units (each made of a monomer). From the viewpoint of rubber properties, the isobutylene polymer is preferably a isobutylene polymer having 50% or more by weight of repeating units each originating from isobutylene, more preferably one having 80% or more by weight of the units, in particular preferably one having 90 to 99% by weight of the units.

The method for synthesizing the unsaturated hydrocarbon polymer is not particularly limited, and may be various polymerization methods that have been hitherto reported. The method is preferably living polymerization about which many reports have been made, particularly, in recent years. Using, out of examples of the living polymerization, iniferter polymerization (J. P. Kennedy et al., J. Polymer Sci., Polymer Chem. Ed. 1977, vol. 15, p. 2869) discovered by Kennedy et al., the saturated hydrocarbon polymer, in particular, isobutylene polymer can easily be produced. It is known that a polymer having a molecular weight of about 500 to 10,000 can be obtained with a molecular weight distribution of 1.5 or less by the polymerization, and various functional groups can be introduced into one or more molecular terminals thereof.

The (meth)acrylate monomer constituting each of the above-mentioned (meth)acrylate (co)polymers is not particularly limited. The monomer may be various monomers. Specific examples thereof include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, (3-trimethoxysilyl)propyl (meth)acrylate, (3-dimethoxymethylsilyl)propyl (meth)acrylate, (2-trimethoxysilyl)ethyl (meth)acrylate, (2-dimethoxymethylsilyl)ethyl (meth)acrylate, trimethoxysilylmethyl (meth)acrylate, (dimethoxymethylsilyl)methyl (meth)acrylate, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, and other (meth)acrylic acid based monomers.

Examples of the monomer unit other than the above-mentioned monomers include acrylic acids such as acrylic acid and methacrylic acid; and monomers each containing an amide group, such as N-methylolacrylamide, and N-methylolmethacrylamide, monomers each containing an epoxy group, such as glycidyl acrylate, and glycidyl methacrylate, and monomers each containing a nitrogen-containing group, such as diethylaminoethyl acrylate, and diethylaminoethyl methacrylate.

The above-mentioned (meth)acrylate polymers may each a polymer obtained by copolymerizing a (meth)acrylate monomer with a vinyl monomer copolymerizable with this monomer. The vinyl monomer is not particularly limited. Examples thereof include styrene monomers, such as styrene, vinyltoluene, α-methylstyrene, chlorostyrene, styrenesulfonic acid, and salts thereof; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile-group-containing monomers such as acrylonitrile and methacrylonitrile; amide-group-containing monomers such as acrylamide and methacrylamide; vinyl ester monomers such as vinyl acetate, vinyl propionate, vinyl pivalate, vinyl benzoate, and vinyl cinnamate; alkenyl monomers such as ethylene and propylene; conjugated diene monomers such as butadiene and isoprene; and vinyl chloride, vinylidene chloride, ally chloride, and allyl alcohol. Two or more of these monomers are also usable as copolymerizable components.

Out of (meth)acrylate polymers obtained from these monomers, copolymers each made from a styrene monomer and a (meth)acrylic acid monomer are preferred since the copolymers are excellent in physical properties. More preferred are (meth)acrylate polymers each made from an acrylate monomer and a methacrylate monomer. Particularly preferred are acrylate polymers each made from an acrylate monomer.

When the polymer (A) is used, in particular, for ordinary architecture or the like, a butyl acrylate polymer made from a butyl acrylate monomer is preferred from a viewpoint that a composition therefor is required to have a low viscosity and a cured product therefor is required to have a low modulus, and a high elongation, weather resistance and heat resistance, and other physical properties. When the polymer (A) is used for automobiles or other articles for which oil resistance and others are required, a copolymer made mainly of ethyl acrylate is preferred. A polymer made from ethyl acrylate is excellent in oil resistance, but may be somewhat poor in low-temperature property (cold resistance). Thus, in order to improve the polymer in low-temperature property, units of ethyl acrylate may be partially substituted with units of butyl acrylate. However, as the proportion of butyl acrylate is made larger, the good oil resistance is further damaged. For articles for which oil resistance is required, the proportion is preferably 40% or less, more preferably 30% or less. In order to improve the low-temperature property and others without damaging the oil resistance, it is also preferred to use a compound in which oxygen is introduced into an alkyl group as a side chain, such as 2-methoxyethyl acrylate or 2-ethoxyethyl acrylate.

However, the introduction of an alkoxy group, which has an ether bond, into the side chain tends to make the heat resistance poor. Thus, it is preferred that the proportion thereof is 40% or less when the polymer is required to have heat resistance. The proportion may be varied to gain an appropriate polymer, considering required oil resistance, heat resistance, low-temperature property, and other physical properties in accordance with the usage (of the final product) that may be of various types, and required purposes. An example in which a balance between oil resistance, heat resistance, low-temperature property and other physical properties is excellent is a copolymer composed of ethyl acrylate, butyl acrylate and 2-methoxyethyl acrylate (ratio by weight: 40-50/20-30/30-20) although the example is not limited to this copolymer. In the present invention, these preferred monomers may be copolymerized or block-copolymerized with a different monomer. At this time, it is preferred that these preferred monomers are contained in a proportion of 40% or more by weight.

The main chain skeleton of the polymer (A) may contain a different component, such as a urethane bond component, as far as the advantageous effects of the present invention are not largely damaged. The urethane bond component is not particularly limited, and may be a group produced by a reaction between an isocyanate group and an active-hydrogen group (hereinafter referred to also as an amide segment group hereinafter).

A cured product obtained by curing a curable composition containing, in its main chain, a urethane bond or ester bond may gain, through the effect of hydrogen bond or some other effect, advantages that the product gains a high hardness and is improved in strength, and other advantages. However, the urethane bond may be cleaved by heat or some other. In order to give such properties to the curable composition of the present invention, an amide segment group may be introduced into the polymer (A), or any amide segment group dares to be excluded from the polymer (A). The polymer (A) having an amide segment group tends to be high in viscosity. Moreover, the polymer (A) having an amide segment group may be improved in curability.

Specific examples of the amide segment group include a urethane group, which is produced by a reaction between an isocyanate group and a hydroxyl group, or a reaction between an amino group and carbonate; a urea group, which is produced by a reaction between an isocyanate group and an amino group; and a thiourethane group, which is produced by a reaction between an isocyanate group and a mercapto group. In the present invention, examples of the amide segment group also include groups each produced by a further reaction between active hydrogen in any one of the urethane, urea and thiourethane groups, and an isocyanate group.

In the polymer (A) used in the present invention, polymers having different main chain skeletons are usable in a mixture form.

In the case of mixing, for example, a polyoxyalkylene polymer with a (meth)acrylate polymer, one or more alkyl (meth)acrylate monomers are contained in a proportion of 50% or more by weight, more preferably in a proportion of 70% or more by weight from the viewpoint of compatibility therebetween. It is preferred to use, as the alkyl (meth)acrylate monomer(s), an alkyl (meth)acrylate monomer having an alkyl group having 1 to 8 carbon atoms (p1), and an alkyl (meth)acrylate monomer having an alkyl group having 10 to 30 carbon atoms (p2). In this case, the ratio by weight of the alkyl (meth)acrylate monomer (p1) to the alkyl (meth)acrylate monomer (p2) (p1/p2) is preferably from 95/5 to 40/60, more preferably from 90/10 to 60/40.

An example of a combination in which no component (p2) is used is preferably a combination of methyl (meth)acrylate, and butyl (meth)acrylate with an alkyl (meth)acrylate monomer having an alkyl group having 7 to 9 carbon atoms, or a combination of an alkyl (meth)acrylate monomer having an alkyl group having 1 or 2 carbon atoms with an alkyl (meth)acrylate monomer having an alkyl group having 7 to 9 carbon atoms from the viewpoint of the compatibility thereof with polyether polymer.

The method for synthesizing the (meth)acrylate polymer is not particularly limited, and may be any known method. However, a polymer obtained by an ordinary free-radical polymerization, in which an azo compound, a peroxide or the like is used as a polymerization initiator, generally has problems of having a large molecular weight distribution value of 2 or more and being large in viscosity. It is therefore preferred to use living radical polymerization in order to yield a (meth)acrylate polymer having a narrow molecular weight distribution and a low viscosity and having, at a molecular chain terminal thereof, crosslinkable functional groups in a high proportion.

A specific example of the free radical polymerization is solution polymerization or bulk polymerization in which a polymerization initiator, a chain transfer agent, a solvent and others are added (to a monomer) and the monomer is polymerized at 50 to 150° C.

Examples of the polymerization initiator include azo compounds such as 2,2'-azobis(2-methylbutyronitrile), dimethyl 2,2'-azobis(2-methylpropionate), 2,2'-azobis(2,4-dimethylvaleronitrile), 2,2'-azobis(4-methoxy-2,4-dimethylvaleronitrile), 2,2'-azobis[N-(2-propenyl)-2-methylpropionamide], and 1,1'-azobis(cyclohexane-1-carbonitrile); diacyl peroxides such as benzoyl peroxide, isobutyryl peroxide, isononanoyl peroxide, decanoyl peroxide, lauroyl peroxide, p-chlorobenzoyl peroxide, and di(3,5,5-trimethylhexanoyl) peroxide; peroxy dicarbonates such as diisopropyl perdicarbonate, di-sec-butyl perdicarbonate, di-2-ethylhexyl perdicarbonate, di-1-methylheptyl perdicarbonate, di-3-methoxybutyl perdicarbonate, and dicyclohexyl perdicarbonate; peroxy esters such as tert-butyl perbenzoate, tert-butyl peracetate, tert-butyl per-2-ethylhexanoate, tert-butyl perisobutyrate, tert-butyl perpivalate, tert-butyl diperadipate, and cumyl perneodecanoate; ketone peroxides such as methyl ethyl ketone peroxide, and cyclohexanone peroxide; dialkyl peroxides such as di-tert-butyl peroxide, dicumyl peroxide, tert-butylcumyl peroxide, and 1,1-di(tert-hexylperoxy)-3,3,5-trimethylcyclohexane; hydroperoxides such as cumene hydroxyperoxide and tert-butylhydroperoxide; 1,1-di(tert-hexylperoxy)-3,3,5-trimethylcylochexane, and other peroxides. These polymerization initiators may be used alone or in any combination of two or more thereof.

Examples of the chain transfer agent include mercapto-group-containing compounds such as n-dodecylmercaptane, tert-dodecylmercaptane, and laurylmercaptane. In the case of desiring to introduce reactive silicon groups to a molecular chain terminal of the (meth)acrylate polymer, it is preferred to use a mercaptosilane compound, which has a reactive silicon group and a mercapto group, such as 3-mercaptopropyltrimethoxysilane, 3-mercaptopropylmethyldimethoxysilane, 3-mercaptopropylchloromethyldimethoxysilane, 3-mercaptopropylmethoxymethyldimethoxysilane, marcaptomethyltrimethoxysilane, or (mercaptomethyl)dimethoxymethylsilane. These may be used alone or in any combination of two or more thereof.

Examples of the solvent include aromatic compounds such as toluene, xylene, styrene, ethylbenzene, p-dichlorobenzene, di-2-ethylhexyl phthalate, and di-n-butyl phthalate; hydrocarbon compounds such as hexane, heptane, octane, cyclohexane, and methylcyclohexane; carboxylic acid ester compounds such as butyl acetate, n-propyl acetate, and isopropyl acetate; ketone compounds such as methyl isobutyl ketone and methyl ethyl ketone; dialkyl carbonate compounds such as dimethyl carbonate and diethyl carbonate; and alcohol compounds such as 1-propanol, 2-propanol, 1-butanol, 2-butanol, isobutyl alcohol, tert-butyl alcohol, and amyl alcohol. Of these compounds, one or more selected from dialkyl carbonate compounds and alcohol compounds are preferred from the viewpoint of a matter that the compounds are not any guideline value established substance according to the Ministry of Health, Labor and Welfare in Japan, odor, a load onto the environment, and others. More preferred are dimethyl carbonate, 1-propanol, 2-propanol, 1-butanol, 2-butanol, isobutyl alcohol, and tert-butyl alcohol, and particularly preferred are 2-propanol and isobutyl alcohol from the viewpoint of the boiling point thereof, and a matter that the emission of all volatile organic compounds from the composition (concerned) can be restrained, the emission being measured according to a measuring method described in GEV Specification and Classification Criteria, Feb. 14, 2001 version, prescribed by GEV (Gemeinschaft Emissionskontrollierte Verlegewerkstoffe, e.V.).

The monomer may be polymerized together with a polyether polymer, a plasticizer that will be detailed later, or some other besides the solvent.

Living radical polymerization is a polymerization method making it possible to yield a polymer having any molecular weight, a narrow molecular weight distribution, and a low viscosity, and further introduce a monomer having a specific functional group into a substantially arbitrary position of the polymer, which is different from the situation according to the free-radical polymerization. Living polymerization denotes, in a narrow sense, a polymerization in which a terminal (of a molecular chain) constantly has activity so that the growth of the molecular chain continues. In general, the term "living polymerization" also includes pseudo-living polymerization, in which terminals are growing in the state that inactivated ones and activated ones, out of the terminals, are in an equilibrium state.

Examples of the living radical polymerization include a polymerization using a cobalt porphyrin complex, as described in Journal of the American Chemical Society (J. Am. Chem. Soc.), 1994, vol. 16, p. 7943; a polymerization using nitrooxide radicals, as described in JP-A-2003-500378; and atom transfer radical polymerization (ATRP method), using, for example, an organic halide or a halogenated sulfonyl compound as an initiator, and using a transition metal complex as a catalyst, as described in JP-A-11-130931. In the present invention, the atom transfer radical polymerization also includes, as an example, the so-called reverse atom transfer radical polymerization as described in Macromolecules, 1999, vol. 32, p. 2872, i.e., a polymerization of causing an ordinary radical initiator such as a peroxide to act onto a highly-oxidized-state species obtained when an ordinary atom transfer radical polymerization catalyst generates radicals, for example, Cu (II') obtained when copper (II) is used as a catalyst, so as to produce an equilibrium state similar to that produced by atom transfer radical polymerization.

Out of examples of the living radical polymerization, the "atom transfer radical polymerization" of polymerizing a (meth)acrylate monomer, using an organic halide or a halogenated sulfonyl compound as an initiator, and using a transition metal composition as a catalyst is more preferred as a method for producing a (meth)acrylate polymer having a specific functional group for the following reasons: this polymerization has characteristics of the above-mentioned "living radical polymerization"; and further the living polymer has, at a terminal thereof, a halogen or any other species that is relatively favorable for functional group converting reaction, and thus a large flexibility is allowable for designing the initiator or catalyst. This atom transfer radical polymerization is described in, for example, Matyjaszewski et al., Journal of the American Chemical Society (J. Am. Chem. Soc.), 1995, vol. 117, p. 5614.

It is allowable to use, as a polymerization method other than these methods, for example, a method of using a metallocene catalyst, and a thiol compound having, in the molecule thereof, at least one reactive silicon group to yield a (meth)acrylate polymer, as disclosed in JP-A-2001-040037, or a high-temperature continuous polymerization of using an agitating-vessel-type reactor to polymerize a vinyl monomer continuously, as disclosed in JP-A-57-502171, JP-A-59-006207, or JP-A-60-511992.

The polymer may contain, as the main chain skeleton thereof, a urethane bond component or any other component as far as the advantageous effects of the present invention are not largely damaged.

The urethane bond component is not particularly limited, and may be a group produced by a reaction between an isocyanate group and an active-hydrogen group (hereinafter referred to also as an amide segment group). The amide segment group is a group represented by —NR$^6$(C=O) wherein R$^6$ represents a hydrogen atom, or a substituted or unsubstituted organic group having 1 to 20 carbon atoms. The amide segment group is not particularly limited. Examples thereof include a urethane group, which is produced by a reaction between an isocyanate group and a hydroxyl group; a urea group, which is produced by a reaction between an isocyanate group and an amino group; a thiourethane group, which is produced by a reaction between an isocyanate group and a mercapto group, and any other functional group having an amide bond; and groups each produced by a further reaction between active hydrogen in any one of the urethane, urea and thiourethane groups, and an isocyanate group.

About a cured product obtained by curing a curable composition made of the polymer containing, in the main chain thereof, a urethane bond or ester bond, the main chain may be unfavorably cleaved at its urethane bond or ester bond moiety by heat or some other, so that the cured product may be remarkably lowered in strength.

When the proportion of the quantity of the amide segment group is large in the main chain skeleton of the polymer (A) of the present invention, the polymer tends to be increased in viscosity. Moreover, the viscosity may rise after the polymer (A) is stored. Thus, the resultant composition may be lowered in workability. Furthermore, as described above, the amide segment group may be cleaved by heat or some other. It is therefore preferred that the polymer (A) does not substantially contain any amide segment group in order to obtain a composition excellent in storage stability and workability. Contrarily, by the amide segment group in the main chain skeleton of the polymer (A), the curable composition tends to be improved in curability. Accordingly, when the main chain skeleton of the polymer (A) contains the amide segment group, the number of amide segments (of this group) is preferably from 1 to 10, more preferably from 1.5 to 5, in particular preferably from 2 to 3 on average per molecule of the polymer (A). If the number is less than 1, the curable composition may be insufficient in curability. If the number is more than 10, the polymer may be raised in viscosity to be difficult to handle.

Specific examples of the amide segment group include a urethane group, which is produced by a reaction between an isocyanate group and a hydroxyl group, or a reaction between an amino group and carbonate; a urea group, which is produced by a reaction between an isocyanate group and an amino group; and a thiourethane group, which is produced by a reaction between an isocyanate group and a mercapto group. In the present invention, examples of the amide segment group of the above-mentioned general formula also include groups each produced by a further reaction between active hydrogen in any one of the urethane, urea and thiourethane groups, and an isocyanate group.

A description is herein made about a method for introducing reactive groups into the polymer (A). In the present invention, the method for introducing, into the polymer, two or more carbon-carbon unsaturated bonds per terminal of the polymer may be a method of causing an alkali metal salt to act onto a hydroxyl-group-terminated polymer, and subsequently causing an epoxy compound having a carbon-carbon unsaturated bond firstly to react with the resultant and causing a halogenated hydrocarbon compound having a carbon-carbon unsaturated bond secondly to react with the resultant. The use of this method makes it possible to attain the introduction of the reactive groups effectively and stably while the molecular weight and the molecular weight distribution of the main chain of the polymer are controlled in accordance with polymerization conditions.

In the present invention, the alkali metal salt is used when the epoxy compound having a carbon-carbon unsaturated bond is caused to react with the hydroxyl-group-terminated polymer; the use of the alkali metal salt makes it possible to cause the epoxy compound having a carbon-carbon unsaturated bond to react with terminal moieties of all molecules of the polymer uniformly. In the case of using not the alkali metal salt but a zinc hexacyanocobaltate complex, the epoxy compound having a carbon-carbon unsaturated bond unfavorably reacts selectively with molecules of the polymer that are low in molecular weight, so that carbon-carbon unsaturated bonds (of molecules of the epoxy compound) are locally introduced into terminal moieties of parts of the polymer molecules. Thus, this case is unfavorable.

Examples of the alkali metal salt used in the present invention include sodium hydroxide, sodium alkoxides, potassium hydroxide, potassium alkoxides, lithium hydroxide, lithium alkoxides, cesium hydroxide, and cesium alkoxides. The salt is preferably sodium hydroxide, sodium methoxide, sodium ethoxide, potassium hydroxide, potassium methoxide, or potassium ethoxide, and is more preferably sodium methoxide or potassium methoxide from the viewpoint of the easiness of the handling thereof, and solubility. Sodium methoxide is particularly preferred from the viewpoint of availability. The alkali metal salt may be used in the state of being dissolved in a solvent.

About the addition amount of the alkali metal salt used in the present invention, the lower limit of the ratio by mole of the salt to the hydroxyl groups of the polymer is preferably 0.5 or more, more preferably 0.6 or more, even more preferably 0.7 or more, or 0.8 or more. The upper limit thereof is preferably 1.2 or less, more preferably 1.0 or less. If the addition amount of the alkali metal salt is excessively small, the reaction does not advance sufficiently. If the addition amount is excessively large, the alkali metal salt remains as an impurity so that a side reaction may unfavorably advance.

The alkali metal salt is used to alkoxylate hydroxyl groups in the polyoxyalkylene polymer. In order to advance this reaction efficiently, it is preferred to remove water and any alcohol other than the hydroxyl-group-containing polymer from the reaction system. For the removal, it is advisable to use a known method, such as heating evaporation, devolatilization under reduced pressure, spray gasification, thin-membrane evaporation, or azeotropic devolatilization.

The temperature when the alkali metal salt is caused to act is preferably from 50 to 150° C. both inclusive, more preferably from 110 to 140° C. both inclusive. The period when the alkali metal salt is caused to act is preferably from 10 minutes to 5 hours both inclusive, more preferably from 30 minutes to 3 hours both inclusive.

The epoxy compound used in the present invention, which has a carbon-carbon unsaturated bond, is in particular preferably a compound by the following general formula (2):

[Formula 4]

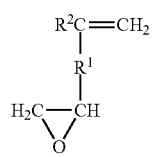

(2)

In the formula, $R^1$ and $R^2$ are the same as described above. Specifically, the epoxy compound is preferably allyl glycidyl ether, methallyl glycidyl ether, glycidyl acrylate, glycidyl methacrylate, butadiene monooxide, or 1,4-cyclopentadiene monoepoxide from the viewpoint of reactive activity, and is in particular preferably ally glycidyl ether.

The addition amount of the epoxy compound used in the present invention, which has a carbon-carbon unsaturated bond, may be any amount, considering the amount and the reactivity of carbon-carbon unsaturated bonds introduced into the polymer. In particular, the lower limit of the ratio by mole of the epoxy compound to the hydroxyl groups contained in the polymer is preferably 0.2 or more, more preferably 0.5 or more. The upper limit thereof is preferably 5.0 or less, more preferably 2.0 or less.

In the present invention, the reaction temperature when the epoxy compound, which has a carbon-carbon unsaturated bond, is caused to undergo a ring-opening addition reaction with the hydroxyl-group-containing polymer is preferably from 60 to 150° C. both inclusive, more preferably from 110 to 140° C. both inclusive. As the temperature is lower, the reaction less advances. If the temperature is excessively high, the main chain of the polyoxyalkylene polymer may be unfavorably decomposed. The reaction time is preferably from 10 minutes to 5 hours both inclusive, more preferably from 30 minutes to 3 hours both inclusive.

The halogenated hydrocarbon compound used in the present invention, which has a carbon-carbon unsaturated bond, is in particular preferably a compound represented by the following general formula (3):

[Formula 5]

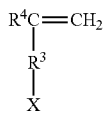
(3)

In the formula, $R^3$ and $R^4$ are the same as described above, and X is a halogen atom. Specific examples thereof include vinyl chloride, allyl chloride, methallyl chloride, vinyl bromide, ally bromide, methallyl bromide, vinyl iodide, ally iodide, and methallyl iodide. Ally chloride and methallyl chloride are more preferred from the viewpoint of the easiness of the handling thereof.

The addition amount of the halogenated hydrocarbon compound, which has a carbon-carbon unsaturated bond, is not particularly limited. The lower limit of the ratio by mole of the compound to hydroxyl groups contained in the polyoxyalkylene polymer is preferably 0.7 or more, more preferably 1.0 or more. The upper limit thereof is preferably 5.0 or less, more preferably 2.0 or less.

The temperature when the halogenated hydrocarbon compound, which has a carbon-carbon unsaturated bond, is caused to react is preferably from 50 to 150° C. both inclusive, more preferably from 110 to 140° C. both inclusive. The reaction time is preferably from 10 minutes to 5 hours both inclusive, more preferably from 30 minutes to 3 hours both inclusive.

The number of hydroxyl groups contained in each molecule of the polymer (A) obtained after the above-mentioned reaction is preferably 0.3 or less, more preferably 0.1 or less in order that the polymer (A) may keep a sufficient stability even when stored over a long term.

The carbon-carbon unsaturated bonds of the polymer (A) of the present invention are usable at will. The bonds are usable for, for example, a base polymer of an addition-curing-type curable composition making use of hydrosilylation reaction with a polyhydrosilyl compound, ene-thiol reaction with a polythiol compound. The polymer (A) is also usable as a macromonomer. Furthermore, using the above-mentioned reaction, a terminal of the polymer (A) can be modified.

The polymer (B) of the present invention is a polymer having, at one terminal moiety thereof, two or more reactive silicon groups. The use of the polymer (B) may improve bonding (performance). It has been verified that a curable composition good in adhesiveness, in particular, under wet-heat resistant conditions is obtained. Water-resistant bonding, or an improvement in adhesiveness onto concrete can be also expected.

The number of a terminal structure or terminal structures which are contained in each molecule of the polymer (B) and have two or more reactive silicon groups is 0.5 or more, more preferably 1.0 or more, even more preferably 1.1 or more, most preferably 1.5 or more on average. The upper limit thereof is preferably 4 or less, more preferably 3 or less.

It is preferred that the polymer (B) hardly has, at any moiety other than its terminal moieties, reactive silicon groups. Even when the polymer (B) has one or more reactive silicon groups thereat, the number thereof is preferably 2 or less. In particular preferably, the polymer (B) does not substantially have any reactive silicon group thereat.

As far as the polymer (B) has, at one terminal moiety thereof, two or more reactive silicon groups, the polymer (B) may have, at a different terminal moiety thereof, a terminal structure having less than 2 reactive silicon groups.

The polymer (B) has reactive silicon groups which are preferably from 1.1 to 5 both inclusive in number, more preferably from 1.2 to 3 both inclusive in number, even more preferably from 1.5 to 2.5 both inclusive in number on average per terminal of the polymer (B).

The reactive silicon groups of the polymer (B) are each represented by the following general formula (4):

wherein $R^5$(s) is/are (each independently) a substituted or unsubstituted hydrocarbon group having 1 to 20 carbon atoms, Y is a hydroxyl group or a hydrolyzable group, and a is 1, 2 or 3.

Specific examples of each of the reactive silicon groups of the polymer (B) include trimethoxysilyl, triethoxysilyl, tris(2-propenyloxy)silyl, triacethoxysilyl, dimethoxymethylsilyl, diethoxymethylsilyl, dimethoxyethylsilyl, (chloromethyl)dimethoxysilyl, (chloromethyl)diethoxysilyl, (methoxymethyl)dimethoxysilyl, (methoxymethyl)diethoxysilyl, (N,N-diethylaminomethyl)dimethoxysilyl, and (N,N-diethylaminomethyl)diethoxysilyl groups. However, the reactive silicon group is not limited thereto. Of these examples, preferred are methyldimethoxysilyl, trimethoxysilyl, triethoxysilyl, (chloromethyl)dimethoxysilyl, (methoxymethyl)dimethoxysilyl, (methoxymethyl)diethoxysilyl, and (N,N-diethylaminomethyl)dimethoxysilyl groups since these groups show a high activity and can give a cured product good in mechanical properties. From the viewpoint of the activity, particularly preferred are trimethoxysilyl, (chloromethyl)dimethoxysilyl, and (methoxymethyl)dimethoxysilyl groups. From the viewpoint of stability, particularly preferred are methyldimethoxysilyl, methyldiethoxysilyl, and triethoxysilyl groups. From the viewpoint of safety, particularly preferred are methyldiethoxysilyl, and triethoxysilyl groups. More preferred are trimethoxysilyl, triethoxysilyl, and dimethoxymethylsilyl groups since the polymer (B) is easily produced.

The method for introducing the reactive silicon groups of the polymer (B) is not particularly limited. Reactive silicon groups may be introduced into a polyoxyalkylene polymer having, at one terminal moiety thereof, a terminal structure having two or more carbon-carbon unsaturated bonds, which is a polymer (A) of the present invention, so as to bond the reactive silicon groups to the unsaturated bonds. This method is favorable since the method can easily have a purifying step before the introduction of the reactive silicon groups to be high in practicability, and can give a good-quality polymer (B) which keeps a sufficient stability even when the polymer (B) is stored over a long term. It is conceivable that a method for gaining the polymer (B) other than this method is, for example, a method of adding, for example, two or more 3-glycidoxypropyltrimethoxysilane molecules thereto. In this case; however, an active terminal and a catalyst for the addition reaction unfavorably remain in the polymer to produce a tendency that a polymer good in stability is not easily obtained.

It is generally known that in a reaction for adding silyl groups to allyl groups through hydrosilylation reaction, the allyl groups are isomerized as a side reaction so that an internal olefin is produced. It is therefore difficult to introduce reactive silicon groups into allyl groups in a proportion of 100%. In other words, when reactive silicon groups are introduced into a polymer having, at a terminal thereof, only one allyl group through hydrosilylation, it is difficult that the reactive silicon groups are introduced into all terminals of molecules of the polymer in a proportion of 100%. Thus, in reaction for the reactive-silicon-group-containing polymer to be obtained, defects are inevitably generated. By contrast, when the polymer (A) of the present invention is used to yield the polymer (B) through hydrosilylation, the polymer (B) which is a polymer having, at one or each terminal, one or more silyl groups per terminal can be obtained since the polymer (A) has, at the terminal, plural allyl groups.

The terminal structure (concerned) of the polymer (B) is represented by the following general formula (5):

[Formula 6]

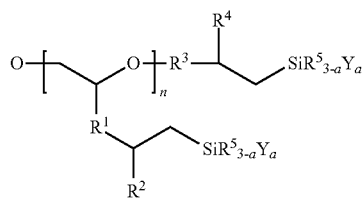

(5)

In the formula, $R^1$, $R^2$, $R^3$, $R^4$, $R^5$, Y, a and n are the same as described above, and the plural silicon groups are each independently selectable.

The method for introducing reactive silicon groups into the polymer (A) is not particularly limited, and may be a known method. Examples of the introduction method are as follows:

(i) Hydrosilylation: the method is a method of adding a hydrosilane compound to the unsaturated bonds through hydrosilylation reaction.

(ii) Reaction with a silane coupling agent: the method is a method of causing the polymer (A) to react with a compound having both of a group capable of reacting with an unsaturated bond to form a bond, and a reactive silicon group (also called a silane coupling agent). An example of the silane coupling agent reactive with an unsaturated bond to form a bond is a mercapto group.

The method (i) is favorable since the reaction is simple, and further the amount of introduced reactive silicon groups is stably adjusted and physical properties of the resultant reactive-silicon-group-containing polymer are stable. The method (□) is favorable in that the method makes the number of reaction options or choices large and makes it easy to heighten the proportion of introduced reactive silicon groups.

Some examples of the hydrosilane compound used in the method (i) are as follows: halogenated silanes such as trichlorosilane, dichloromethylsilane, chlorodimethylsilane, dichlorophenylsilane, chloromethyldichlorosilane, dichloromethyldichlorosilane, bis(chloromethyl)chlorosilane, and methoxymethyldichlorosilane; alkoxysilanes such as trimethoxysilane, triethoxysilane, dimethoxymethylsilane, diethoxymethylsilane, dimethoxyphenylsilane, ethyldimethoxysilane, methoxydimethylsilane, ethoxydimethylsilane, chloromethylmethylmethoxysilane, chloromethyldimethoxysilane, chloromethyldiethoxysilane, chloromethylmethoxymethylsilane, bis(chloromethyl)methoxysilane, methoxymethylmethylmethoxysilane, methoxymethyldimethoxysilane, methoxymethyldiethoxysilane, ethoxymethyldiethoxysilane, 3,3,3-trifluoropropyldimethoxysilane, N,N-diethylaminomethyldiethoxysilane, chloromethyldimethoxysilyloxydimethylsilane, chloromethyldiethoxysilyloxydimethylsilane, methoxymethyldimethoxysilyloxydimethylsilane, diethylaminomethyldimethoxysilyloxydimethylsilane, and 3,3,3-trifluoropropyldimethoxysilyloxydimethylsilane; acyloxysilanes such as diacetoxymethylsilane and diacethoxyphenylsilane; ketoxymate silanes such as bis(dimethylketoxymate) methylsilane and bis(cyclohexylketoxymate) methylsilane; and isopropenyloxysilanes (acetone-eliminated type) such as triisopropenyloxysilane, chloromethyldiisopropenyloxysilane, and methoxymethyldiisopropenyloxysilane.

About the use amount of the hydrosilane, the ratio by mole of the hydrosilane to unsaturated groups in a polymer that is a precursor (of the polymer (B)) (the ratio of the mole number of the hydrosilane to that of the unsaturated groups) is preferably from 0.05 to 10 from the viewpoint of reactivity, and is preferably from 0.3 to 2 from the viewpoint of economic efficiency.

The hydrosilylation reaction is accelerated by various catalysts. The catalysts for hydrosilylation may be known catalysts, such as various complexes each including cobalt, nickel, iridium, platinum, palladium, rhodium, ruthenium, or some other element. For example, the following are usable: a catalyst in which platinum is carried on a carrier made of alumina, silica or carbon black, and platinic chloride; a platinic chloride complex composed of platinic chloride and, e.g., an alcohol, aldehyde or ketone; a platinum-olefin complex [such as $Pt(CH_2=CH_2)_2(PPh_3)$, or $Pt(CH_2=CH_2)_2Cl_2$]; a platinum-vinylsiloxane complex $[Pt\{(vinyl)Me_2SiOSiMe_2(vinyl)\}$ or $Pt\{Me(vinyl)SiO\}_4\}]$; a platinum-phosphine complex $[Ph(PPh_3)_4$, or $Pt(PBu_3)_4]$; and a platinum-phosphate complex $[Pt\{P(OPh)_3\}_4]$. It is preferred from the viewpoint of reaction efficiency to use a platinum catalyst such as platinic chloride, or a platinum vinylsiloxane complex. The temperature condition for the silylation reaction is not particularly limited. In order to lower the viscosity of the reaction system or improve the reactivity, the reaction is conducted preferably under heating conditions, more preferably at a temperature of 50 to 150° C., in particular preferably at a temperature of 70 to 120° C. If the reaction time becomes longer than required, the polymer main chain may be deteriorated. Thus, it is preferred to adjust the reaction time together with the temperature. The temperature and the reaction time are affected by the main chain structure of the polymer. For making the production process efficient, the reaction is ended preferably in a period of 30 minutes to 5 hours both inclusive, more preferably in a period of 3 hours or shorter.

About the polymer (B), the content by percentage of the reactive silicon groups therein is large so that hydrolysis-condensation reaction of the reactive silicon groups advances simultaneously with the hydrosilylation. For such reasons, the polymer (B) may be increased in molecular weight or may be increased in viscosity when stored over a long term.

Thus, in the method for producing the polymer (B) through hydrosilylation, the viscosity-increase and the storage stability of the polymer (B) can be solved or improved by using a trialkyl orthocarboxylate (E).

Specific examples of the trialkyl orthocarboxylate (E) include trimethyl orthoformate, triethyl orthoformate, trimethyl orthoacetate, and triethyl orthoacetate. Trimethyl orthoformate, and trimethyl orthoacetate are more preferred.

The use amount of the trialkyl orthocarboxylate (E) is from 0.1 to 10 parts by weight, preferably from 0.1 to 3 parts by weight for 100 parts by weight of the polymer (A). If the use amount is small, the advantageous effects may not be sufficiently obtained to cause a rise in the viscosity of the polymer (B). If the use amount is excessively large, an economical disadvantage is caused and further work quantity is increased for the step of removing the orthoester (E).

Examples of the silane coupling agent usable in the method (ii) include mercaptosilanes such as 3-mercaptopropyltrimethoxysilane, 3-mercaptopropyldimethoxymethylsilane, 3-mercaptopropyltriethoxysilane, mercaptomethyltriethoxysilane, and mercaptomethyldimethoxymethylsinae. These silane coupling agents are mere examples. By using or applying a similar reaction, a silyl group can be introduced.

About the main chain structure of the polymer (B), the same description as about the polymer (A) are applicable to a preferred number-average molecular weight, molecular weight distribution, linear or branched structure, main chain species and method for producing various chains thereof, and others.

The polymer(s) (A) and/or (B) of the present invention can be used as a curable composition. Hereinafter, a description will be made in detail about a curable composition using the polymer(s) (A) and/or (B) obtained according to the present invention.

The curable composition of the present invention contains, as one or more essential components, the polymer (A) and/or the polymer (B), and may contain a polymer having, at one terminal structure thereof, one carbon-carbon unsaturated bond, and/or a polymer having, at one terminal structure thereof, one reactive silicon group. The blend amount of the optional polymer(s) is preferably from 1 to 200 parts by weight both inclusive, more preferably from 10 to 100 parts by weight both inclusive for 100 parts by weight of the total of the polymers (A) and (B).

The same description as about polymers (A) and (B) are applicable to structures of the optional polymer(s) which are other than the terminated reactive group thereof, and methods for producing the polymer(s).

The polymer having, at one terminal structure thereof, one carbon-carbon unsaturated bond preferably has a carbon-carbon unsaturated bond or carbon-carbon unsaturated bonds which are from 0.5 to 3 both inclusive in number on average per molecule of the polymer. About the polymer having, at one terminal structure thereof, one carbon-carbon unsaturated bond, the carbon-carbon unsaturated bond which the polymer has is, for example, an allyl or methallyl group.

The polymer having, at one terminal structure thereof, one reactive silicon group preferably has reactive silicon groups which are from 1.2 to 3 both inclusive in number on average per molecule of the polymer. About the polymer having one reactive silicon group, the reactive silicon group which the polymer has is, for example, a dimethoxymethyl, trimethoxysilyl or triethoxysilyl group.

About the polymer having, at one terminal structure thereof, one reactive silicon group, the following method (iii) is usable besides the method (i) or (ii) as a method for introducing the reactive silicon group to the polymer:

(iii) Reaction between the reactive-group-containing polymer and a silane coupling agent: the method is a method of causing a precursor polymer having a reactive group, such as a hydroxyl group, an amino group or an unsaturated bond, to react with a compound having both of a group capable of reacting with the reactive group to form a bond, and a reactive silicon group (also called a silane coupling agent). Examples of a combination of the reactive group of the precursor polymer and the reactive group of the silane coupling agent include a hydroxyl group and an isocyanate group, a hydroxyl group and an epoxy group, an amino group and an isocyanate group, an amino group and a thioisocyanate group, an amino group and an epoxy group, an amino group and an acrylic structure subjected to Michael addition to the group, and a carboxylate group and an epoxy group.

Examples of the silane coupling agent usable in the method (iii) are as follows: isocyanatosilanes, which are reactive with a hydroxyl group, such as 3-isocyanatopropyltrimethoxysilane, 3-isocyanatopropyldimethoxymethylsilane, 3-isocyanatopropyltriethoxysilane, 3-isocyanatopropyl(methoxymethyl)(methoxy) silane, isocyanatomethyltrimethoxysilane, isocyanatomethyltriethoxysilane, and isocyanatomethyldimethoxymethylsilane; epoxysilanes, which are reactive with hydroxyl, amino and carboxylate groups, such as 3-glycidoxypropyltrimethoxysilane, 3-glycidoxypropyldimethoxymethylsilane, 3-glycidoxypropyltriethoxysilane, glycidoxymethyltrimethoxysilane, 3-glycidoxypropyl(methoxymethyl)(methoxy) methysilane, glycidoxymethyltriethoxysilane, and glycidoxymethyldimethoxymethylsilane; aminosilanes, which are reactive with isocyanate and thioisocyanate groups, such as 3-aminopropyltrimethoxysilane, 3-aminopropyldimethoxymethylsilane, 3-aminopropyltriethoxysilane, 3-aminopropyl(methoxymethyl)(methoxy)methylsilane, 3-(2-aminoethyl)propyltrimethoxysilane, 3-(2-aminoethyl)propyldiethoxysilane, 3-(2-aminoethyl)propyltriethoxysilane, 3-(N-ethylamino)-2-methylpropyltrimethoxysilane, 3-ureidopropyltrimethoxysilane, 3-ureidopropyltriethoxysilane, N-phenyl-3-aminopropyltrimethoxysilane, N-benzyl-3-aminopropyltrimethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, and bis(3-(trimethoxysilyl)propyl)amine; (meth)acryloxysilanes, which are reactive with an amino group, such as 3-(meth)acryloxypropyltrimethoxysilane, 3-(meth)acryloxypropyltriethoxysilane, (meth)acryloxymethyltrimethoxysilane, (meth)acryloxymethyldimethoxymethylsilane, and (meth)acryloxymethyltriethoxysilane; and hydroxyalkylsilanes, such as 3-hydroxypropyltrimethoxysilane and hydroxymethyltriethoxysilane. These silane coupling agents are mere examples. By using or applying a similar reaction, a silyl group can be introduced.

The introduction of a silicon group according to the reaction of these agents may be based on a direct reaction between the reactive groups of the polymer terminal and any one of the above-mentioned silane compounds, or may make use of a multistep reaction using a reaction with an additional compound. Examples of the additional compound include compounds having two or more reaction points, such as diisocyanate compounds, primary amine compounds, and carbonate compounds.

As the composition of the present invention, the following is preferably usable since the resultant cured product is good in balance between stretchability and strength to be favorably usable: a composition having a polyoxyalkylene polymer (B1) having, at one terminal thereof, plural reactive silicon groups, and a (meth)acrylate polymer (C) having one or more reactive silicon groups. The reactive silicon group(s) of the polymer (C) may be positioned at the terminal(s) of the polymeric main chain, or in the middle of the main chain.

The (meth)acrylate monomer constituting the main chain of the (meth)acrylate polymer (C) having one or more reactive silicon groups is not particularly limited, and may be various species. Specific examples thereof include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, (3-trimethoxysilyl)propyl (meth)acrylate, (3-dimethoxymethylsilyl)propyl (meth)acrylate, (2-trimethoxysilyl)ethyl (meth)acrylate, (2-dimethoxymethylsilyl)ethyl (meth)acrylate, trimethoxysilylmethyl (meth)acrylate, (dimethoxymethylsilyl)methyl (meth)acrylate, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl methacrylate, trifluoromethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, and other (meth)acrylate monomers.

Examples of the monomer unit other than the above-mentioned monomers include acrylic acids such as acrylic acid and methacrylic acid; and monomers each containing an amide group, such as N-methylolacrylamide and N-methylolmethacrylamide, monomers each containing an epoxy group, such as glycidyl acrylate and glycidyl methacrylate, and monomers each containing a nitrogen-containing group, such as diethylaminoethyl acrylate and diethylaminoethyl methacrylate.

The (meth)acrylate polymer (C) may a polymer obtained by copolymerizing a (meth)acrylate monomer with a vinyl monomer copolymerizable with this monomer. The vinyl monomer is not particularly limited. Examples thereof include styrene monomers, such as styrene, vinyltoluene, α-methylstyrene, chlorostyrene, styrenesulfonic acid, and salts thereof; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile-group-containing vinyl monomers such as acrylonitrile and methacrylonitrile; amide-group-containing vinyl monomers such as acrylamide and methacrylamide; vinyl ester monomers such as vinyl acetate, vinyl propionate, vinyl pivalate, vinyl benzoate, and vinyl cinnamate; alkenyl monomers such as ethylene and propylene; conjugated diene monomers such as butadiene and isoprene; and vinyl chloride, vinylidene chloride, ally chloride, and allyl alcohol. Two or more of these monomers are also usable as copolymerizable components.

Out of (meth)acrylate polymers obtained from these monomers, copolymers each made from a styrene monomer and a (meth)acrylic acid monomer are preferred since the copolymers are excellent in physical properties. More preferred are (meth)acrylate polymers each made from an acrylate monomer and a methacrylate monomer. Particularly preferred are acrylate polymers each made from an acrylate monomer.

The number of the reactive silicon group(s) of the polymer (C) per molecule thereof is preferably 1.0 to 5.0 on average. From the viewpoint of mechanical properties obtained when the curable composition is cured, the number is more preferably 1.27 or more. From the viewpoint of the stability of the polymer (C), the number is more preferably 3.0 or less.

The method for introducing one or more reactive silicon groups into a (meth)acrylate polymer is not particularly limited, and may be, for example, methods described below. (iv) A method of copolymerizing a compound having a polymerizable unsaturated group and a reactive-silicon-containing group with any one of the above-mentioned monomers; the use of this method produces a tendency that reactive silicon groups are introduced at random into the main chain of the polymer. (v) A method of using a mercaptosilane compound having a reactive-silicon-containing group as a chain transfer agent to polymerize a (meth)acrylate polymer; the use of this method makes it possible to introduce reactive silicon groups at a terminal of the polymer. (vi) A method of copolymerizing a compound having a polymerizable unsaturated group and a reactive functional group (V group), and then causing the resultant to react with a compound having a functional group reactive with the reactive silicon group and with the V group; specific examples of this method include a method of copolymerizing 2-hydroxyethyl acrylate, and then causing the hydroxyl group of the resultant to react with an isocyanatosilane having a reactive-silicon-containing group, and a method of copolymerizing glycidyl acrylate, and then causing the epoxy group of the resultant to react with an aminosilane compound having a reactive-silicon-containing group. (vii) A method of modifying a terminated functional group of a (meth)acrylate polymer synthesized by living radical polymerization to introduce a reactive silicon group thereinto. About the (meth)acrylate polymer obtained by living radical polymerization, a functional group is easily introduced into a terminal of the polymer. By modifying this functional group, a reactive group can be introduced into the polymer terminal.

Examples of the silicon compound usable to introduce the functional silicon group(s) of the (meth)acrylate polymer (C) by use of the above-mentioned methods are described hereinafter. Examples of the compound used in the method (iv), which has a polymerizable unsaturated group and a reactive silicon group, include 3-(trimethoxysilyl)propyl (meth)acrylate, 3-(dimethoxymethylsilyl)propyl (meth) acrylate, 3-(triethoxysilyl)propyl (meth)acrylate, (trimethoxysilyl)methyl (meth)acrylate, (dimethoxymethylsilyl)methyl (meth)acrylate, (triethoxysilyl)methyl (meth) acrylate, (diethoxymethylsilyl)methyl (meth)acrylate, and 3-((methoxymethyl)dimethoxysilyl)propyl (meth)acrylate. From the viewpoint of availability, particularly preferred are trimethoxysilylpropyl (meth)acrylate, and (dimethoxymethyl)propyl (meth)acrylate.

Examples of the mercaptosilane compound used in the method (v), which has a reactive-silicon-containing group, include 3-mercaptopropyltrimethoxysilane, 3-mercaptopropyldimethoxymethylsilane, 3-mercaptopropyltriethoxysilane, mercaptomethyltrimethoxysilane, (mercaptomethyl)dimethoxymethylsilane, and mercaptomethyltriethoxysilane.

Examples of the compound used in the method (vi), which has a reactive silicon group and a V group, include isocyanatesilane compounds such as 3-isocyanatopropyltrimethoxysilane, 3-isocyanatopropyldimethoxymethylsilane, 3-isocyanatopropyltriethoxysilane, isocyanatomethyltrimethoxysilane, isocyanatomethyltriethoxysilane, isocyanatomethyldimethoxymethylsilane, and isocyanatomethyldiethoxymethylsilane; epoxysilane compounds such as 3-glycidoxypropyltrimethoxysilane, 3-glycidoxypropyltriethoxysilane, 3-glycidoxypropyldimethoxymethylsilane, glycidoxymethyltrimethoxysilane, glycidoxymethyltriethoxysilane, glycidoxymethyldimethoxymethylsilane, and glycidoxymethyldiethoxymethylsilane; and aminosilane compounds, such as 3-aminopropyltrimethoxysilane, 3-aminopropyltriethoxysilane, 3-aminopropyldimethoxymethylsilane, aminomethyltrimethoxysilane, aminomethyltriethoxysilane, aminomethyldimethoxymethylsilane, N-cyclohexylaminomethyltriethoxysilane, N-cyclohexylaminomethyldiethoxymethylsilane, N-phenylaminomethyltrimethylsilane, and (2-aminoethyl)aminomethyltrimethoxysilane.

In the method (vii), any modifying reaction is usable. For example, the following method is usable therefor: a method of using a compound having a functional group reactive with the terminated reactive group obtained by polymerization, and a silicon group; or a method of using a compound having a functional group reactive with the terminated reactive group, and a double bond to introduce a double bond into a terminal of the polymer, and then introducing a reactive silicon group into this double bond through hydrosilylation or some other reaction.

Two or more of these methods may be combined with each other at will. In the case of combining, for example, the methods (vi) and (v) with each other, the polymer (C) that is a polymer having one or more reactive silicon groups at a molecular chain terminal and/or a side chain thereof can be obtained.

The reactive silicon group(s) of the polymer (C) is/are (each) represented by the following general formula (4):

(4)

When the polymer (B1) is combined with the polymer (C) having one or more reactive silicon groups (b3) (each) represented by the general formula (4) in which a is 3, a cured product having a higher toughness is obtained. The reactive silicon group(s) (b3) is/are (each) preferably a trimethoxysilyl or triethoxysilyl group.

The inventors have found out that when the polymer (B1) in the curable composition containing the polymer (B1) and the polymer (C) is a polyoxyalkylene polymer having both species of one or more reactive silicon groups (b2) (each) represented by the general formula (4) in which a is 2, and one or more reactive silicon groups (b3) (each) represented by the general formula (4) in which a is 3, the resultant cured product is higher in strength. In the same manner, the inventors have found out that also when the curable composition contains, as species of the polymer (B1), both of a polyoxyalkylene polymer having one or more reactive silicon groups (b2) and a polyoxyalkylene polymer having one or more reactive silicon groups (b3), a cured product having a far higher strength is obtained. The reactive silicon group(s) (b2) is/are (each) preferably a dimethoxymethylsilyl group, and the reactive silicon group(s) (b3) is/are (each) preferably a trimethoxysilyl group. The method for producing the polymer (B1) having, in a single molecule thereof, the reactive silicon group(s) (b2) and the reactive silicon group(s) (b3) may be, for example, a method of hydrosilylating a polyoxyalkylene having ally groups at both terminals thereof, respectively, with a mixture of trimethoxysilane and dimethoxymethylsilane.

It is general for those skilled in the art that the monomer composition of the polymer (C) is selected in accordance with the usage and purpose (of the final product). For a usage about which strength is required, the glass transition temperature (Tg) is preferably relatively high. The temperature Tg is preferably from 0 to 200° C. both inclusive, more preferably from 20 to 100° C. both inclusive. The temperature Tg is gained by Fox's equation described below.

Fox's equation:

$$1/(Tg(K))=\Sigma(Mi/Tgi)$$

wherein Mi represents the proportion by weight of a monomer component "i" which is a constituent element of a polymer, and Tgi represents the glass transition temperature (K) of a homopolymer made from the monomer "i".

The number-average molecular weight of the polymer (C) is not particularly limited, and is preferably from 500 to 100,000, more preferably from 500 to 50,000, in particular preferably from 1,000 to 30,000 in terms of that of polystyrene through GPC measurement.

Methods for blending the polymer (B1) with the polymer (C), which has one or more reactive silicon groups, are suggested in JP-A-59-122541, JP-A-63-112642, JP-A-06-172631, JP-A-11-116763 and others. A different method is also usable in which a (meth)acrylate monomer is polymerized in the presence of a polyoxypropylene polymer having a reactive silicon group. This producing method is specifically disclosed in JP-A-59-78223, JP-A-60-228516, JP-A-60-228517 and other publications. The polymer (B1) of the present invention can be blended with the polymer (C) by the same method. However, the blending method is not limited to these methods.

The blend ratio between the polymer (B1) and the polymer (C) is not particularly limited. The ratio (by weight) of (B1) to (C) is preferably from 95/5 to 10/90, more preferably from 80/20 to 20/80, in particular preferably from 70/30 to 30/70. About each of the polymer (B1) of the present invention, and the polymer (C), only one species thereof may be used, or two or more species thereof may be used together.

In the present invention, a curable composition is usable which contains the polymer (B) and a polymer (D) having a reactive silicon group or reactive silicon groups which are 0.5 or more and less than 1.2 in number on average per molecule of the polymer (D). The combination of these two polymers makes it possible to adjust a balance between the viscosity of the curable composition and mechanical strengths of the resultant cured product.

The same description as about the polymer (A) is applicable to the main chain structure of the polymer (D). The main chain structure is preferably identical with that of the polymer (B). Moreover, the main chain structure is preferably a polyoxyalkylene polymer.

When the polymer (B) is used together with the polymer (D), the number-average molecular weight of the polymer (B) is more preferably from 5,000 to 50,000, in particular preferably from 10,000 to 35,000 in terms of that of polystyrene through GPC. The number-average molecular weight of the polymer (D) is more preferably from 3,000 to 50,000, in particular preferably from 3,000 to 10,000.

The molecular weight distribution of the polymer (D) is not particularly limited, and is preferably less than 2.0, more preferably 1.6 or less, in particular preferably 1.4 or less, or 1.3 or less.

The reactive silicon group(s) of the polymer (D) can (each) be represented by the following general formula (4):

$$—SiR^5{}_{3-a}Y_a \quad (4)$$

In order for the curable composition to supply, when cured, a rubbery cured product having high mechanical properties, the lower limit and the upper limit of the number of the reactive silicon group(s) of the polymer (D) are preferably 0.5 or more, and 1.2 or less, respectively, on average per molecule of the polymer (D). From the viewpoint of the mechanical properties at the curing time, the lower limit and the upper limit are more preferably 0.8 or more, and 1.0 or less, respectively.

The reactive silicon group(s) of the polymer (D) may be positioned at its molecular chain terminal(s), its side chain terminal(s), or both thereof. It is more preferred that the reactive silicon group(s) is/are positioned, in particular, at the molecular chain terminal(s) since the between-crosslinking-point molecular weight becomes large so that a rubbery cured product showing a high strength and a high elongation is easily obtained.

The number on average of the reactive silicon groups in the reactive-silicon-group-containing polymer of the present invention is defined as the number thereof on average that is measured by a method of determining, quantitatively by high-resolution $^1$H-NMR analysis, protons onto which the reactive silicon groups are directly bonded. In the calculation of the number on average of the reactive silicon group(s) in the polymer (D), not only a precursor of the polymer which remains at the time of introducing reactive silicon groups into the precursor, into which no reactive silicon group has been introduced, but also any reactive-silicon-group-non-introduced polymer obtained by a side reaction at this time are also regarded as parts of components of the polymer (D), which has the same main chain structure as these components. The calculation is made under a condition that the number of these molecules is included into the population parameter (the number of molecules) when the number on average of the reactive silicon group(s) per molecule of the polymer (D) is calculated.

As far as the main chain structure of the polymer (D) satisfies a requirement that the reactive silicon group(s) per molecule is/are 0.5 or more and less than 1.2 in number on average, the structure may be a linear or branched structure, or a structure having, at one terminal thereof, plural reactive silicon groups as represented by the general formula (5). More preferred is a linear polymer in which reactive silicon groups are introduced into only one terminal thereof. As far as the main structure satisfies the requirement that the reactive silicon group(s) per molecule is/are 0.5 or more and less than 1.2 in number on average, the main chain structure may be not made of a single species, and may be made of a mixture of polymers produced separately from each other, or a mixture of polymers produced simultaneously.

The reactive silicon groups of the polymer (B) and the polymer (D) are selectable at will. It is preferred that the polymers (B) and (D) have the same reactive silicon groups since physical properties of the resultant cured product are easily adjusted. The reactive silicon groups are in particular preferably dimethoxysilyl groups.

The blend amount of the polymer (D) is more preferably from 1 to 100 parts by weight both inclusive, more preferably from 10 to 50 parts by weight both inclusive for 100 parts by weight of the polymer (B).

The curable composition of the present invention may contain an organopolysiloxane polymer (F) having a reactive silicon group. The polysiloxane is a polymer having a main chain in which a siloxane bond is repeated. An example thereof is polydimethylsiloxane. The polysiloxane may be a polysiloxane showing fluidity at normal temperature. The polysiloxane may contain, as its main chain, a different polymer component such as a polyoxyalkylene. By the use of the polysiloxane, it is expectable that the curable composition produces viscosity-decreasing and plasticizing effects. It is also expectable that the composition is improved in low-temperature workability, and the resultant cured product is improved in surface tackiness, and is controlled about mechanical properties. The polysiloxane may have a reactive silicon group. Examples of the reactive silicon group include dimethoxymethylsilyl, trimethoxysilyl, and triethoxysilyl groups. The use of such a polysiloxane may improve the cured product in strength. The blend amount of the polysiloxane is preferably from 1 to 100 parts by weight, more preferably from 5 to 50 part by weight, in particular preferably from 10 to 30 parts by weight for 100 parts by weight of the polymer (B).

In the present invention, a silanol condensing catalyst is used to promote hydrolysis/condensation reactions of the reactive silicon groups of the polymers (B), (C), (D) and (F) to extend the chain of the (resultant) polymer or crosslink the polymer.

It is already known that many catalysts are usable as the silanol condensing catalyst for the reactive-silicon-group-containing polymer. Examples thereof include an organic tin compound, a metal carboxylate, an amine compound, a carboxylic acid, an alkoxy metal, and an inorganic acid.

Specific examples of the organic tin compound include dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonate), dioctyltin bis(acetylacetonate), dibutyltin bis(ethylacetoacetonate), a reaction product made from dibutyltin oxide and a silicate compound, a reaction product made from dioctyltin oxide and a silicate compound, and a reaction product made from dibutyltin oxide and a phthalate. From the viewpoint of an increase in interest in the environment in recent years, it is preferred to use a dioctyltin compound rather than any dibutyltin compound.

Specific examples of the metal carboxylate include tin carboxylates, lead carboxylates, bismuth carboxylates, potassium carboxylates, calcium carboxylates, barium carboxylates, titanium carboxylates, zirconium carboxylates, hafnium carboxylates, vanadium carboxylates, manganese carboxylates, iron carboxylates, cobalt carboxylates, nickel carboxylates, and cerium carboxylates. The carboxylate group may be a combination of one out of carboxylic acids which will be described later with a metal that may be of various types. The metal species is preferably bivalent tin, bismuth, bivalent iron, trivalent iron, zirconium, or titanium since the species is high in activity. Bivalent tin is most preferred.

Specific examples of the amine compound include aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triallylamine and oleylamine; aromatic amines such as aniline, laurylaniline, stearylaniline, and triphenylamine; nitrogen-containing heterocylic compounds such as pyridine, 2-aminopyridine, 2-(dimethylamino)pyridine, 4-(dimethylaminopyridine), 2-hydroxypyridine, imidazole, 2-ethyl-4-methylimidazole, morpholine, N-methylmorpholine, piperidine, 2-piperidinemethanol, 2-(2-piperidino)ethanol, piperidone, 1,2-dimethyl-1,4,5,6-tetrahydropyrimidine, 1,8-diazabicyclo[5,4,0]undecene-7 (DBU), 6-(dibutylamino)-1,8-diazabicyclo[5,4,0]undecene-7 (DBA-DBU), 6-(2-hydroxypropyl)-1,8-diazabicyclo[5,4,0]undeca-7-ene (OH-DBU), a compound in which the OH group of OH-DBU is modified by urethanation or some other, 1,5-diazabicyclo[4,3,0]nonene-5 (DBN), 1,4-diazabicyclo[2,2,2]octane (DABCO), and aziridine; salts derived from nitrogen-containing heterocylic compounds, such as a phenolic salt of DBU (specifically, trade name: U-CAT SA1 (manufactured by San-Apro Ltd.), an octylate of DBU (specifically, trade name: U-CAT SA102 (manufactured by San-Apro Ltd.)), a p-toluenesulfonate of DBU (specifically, trade name: U-CAT SA506 (manufactured by San-Apro Ltd.)), and an octylate of DBN (specifically, trade name: U-CAT 1102 (manufactured by San-Apro Ltd.)); and other amines such as monoethanolamine, diethanolamine, triethanolamine, 3-hydroxypropylamine, ethylenediamine, propylenediamine, hexamethylenediamine, N-methyl-1,3-propanediamine, N,N'-dimethyl-1,3-propanediamine, diethylenetriamine, triethylenetetramine, 2-(2-aminoethylamino)ethanol, benzylamine, 3-methoxypropylamine, 3-lauryloxypropylamine, 3-dimethylaminopropylamine, 3-diethylaminopropylamine, 3-dibutylaminopropylamine, 3-morpholinopropylamine, 2-(1-piperazinyl)ethylamine, xylylenediamine, and 2,4,6-tris(dimethylaminomethyl)phenol; guanidines such as guanidine, phenylguanidine, and diphenylguanidine; and biguanides, such as butylbiguanide, 1-o-tolylbiguanide, and 1-phenylbiguanide.

Of these examples, preferred are amidines such as 1,2-dimethyl-1,4,5,6-tetrahydropyrimidine, DBU, DBA-DBU, DBN and other amidines; guanidines such as guanidine, phenylguanidine, and diphenylguanidine; and biguanides such as butylbiguanide, 1-o-tolylbiguanide, and 1-phenylbiguanide since these compounds show a high activity. Aryl-substituted biguanides such as 1-o-tolylbiguanide and 1-phenylbiguanide are preferred since it is expectable that the resultant product has a high adhesiveness.

Amine compounds show basicity. An amine compound about which the pKa value of a conjugated acid thereof is 11 or more is preferred since the catalyst activity is also high. Particularly preferred are 1,2-dimethyl-1,4,5,6-tetrahydropyrimidine, DBU, DBN and others since these compounds each show, as a pKa value of a conjugated acid thereof, a value of 12 or more to exhibit a high catalyst activity.

The amine compound used in the silanol condensing catalyst in the present invention may be an amino-group-containing silane coupling agent (referred to also as an aminosilane). One or more hydrolyzable groups of the aminosilane used as the silanol condensing catalyst in the present invention is/are (each) more preferably an alkoxy group such as a methoxy or ethoxy group, in particular preferably a methoxy or ethoxy group since the group is mild in hydrolyzability to be easy to handle. Ethoxy and isopropenoxy groups are preferred from the viewpoint of safety since compounds eliminated therefrom by reaction are ethanol and acetone, respectively. The number of the hydrolyzable group(s) is preferably 2 or more, in particular preferably 3 or more from the viewpoint of catalyst activity.

The silanol condensing catalyst may be a ketimine compound, from which an amine compound as described above is produced by hydrolysis.

Specific examples of the above-mentioned carboxylic acid include acetic acid, propionic acid, butyric acid, 2-ethylhexanoic acid, lauric acid, stearic acid, oleic acid, linoleic acid, pivalic acid, 2,2-dimethylbutyric acid, 2,2-diethylbutyric acid, 2,2-dimethylhexanoic acid, 2,2-diethylhexanoic acid, 2,2-dimethyloctanoic acid, 2-ethyl-2,5-dimethylhexanoic acid, neodeconoic acid, and versatic acid. 2-Ethylhexanoic acid, neodeconoic acid, and versatic acid are preferred since the acids are high in activity, and available. Derivatives of these carboxylic acids are also usable, examples thereof including carboxylic anhydrides, alkyl carboxylates, amides, nitriles, and halogenated acyls.

Specific examples of the afore-mentioned alkoxy metal include titanium compounds such as tetrabutyl titanate, tetrapropyl titanate, titanium tetrakis(acetylacetonate), diisopropoxytitanium bis(acetylacetonate), and diisopropoxytitanium bis(ethylacetoacetate); aluminum compounds such as aluminum tris(acetylacetonate), aluminum tris(ethylacetoacetate), diisopropoxyaluminum ethylacetoacetate; zirconium compounds such as zirconium tetrakis (acetylacetonate); and hafnium compounds such as tetrabutoxyhafnium.

Other examples of the silanol condensing catalyst include organic sulfonic acids such as trifluoromethanesulfonic acid; inorganic acids such as hydrochloric acid, phosphoric acid, and boronic acid; trifluoroboron complexes such as trifluorboron, a trifluoroborondiethyl ether complex, and a trifluoroboronethylamine complex; fluorine-anion-containing compounds such as ammonium fluoride, tetrabutylammonium fluoride, potassium fluoride, cesium fluoride, ammonium hydrogenfluoride, 1,1,2,3,3,3-hexafluoro-1-diethylaminopropane (MEC 81, popularly known as a Ishikawa reagent), potassium hexafluorophosphate, $Na_2SiF_6$, $K_2SiF_6$, and $(NH_4)_2SiF_6$.

The silanol condensing catalyst may be also an optical acid generator or an optical base generator, which generates an acid or base by light. Examples of the optical acid generator include onium salt optical acid generators, such as triarylsulfonium salts such as p-phenylbenzylmethyl sulfonium, p-hydroxyphenylbenzylmethyl sulfonium, triphenyl sulfonium, and diphenyl[4-(phenylthio)phenyl]sulfonium salts, and iodonium salts such as 4,4-bis[di(β-hydroxyethoxy)phenylsulfonio]phenylsulfidebishexafluoro antimonite, diphenyliodonium, bis(4-tert-butylphenyl)iodonium, (4-tert-butoxyphenyl)phenyliodonium, and (4-methoxyphenyl)phenyliodonium salts; sulfonic acid derivatives, such as benzoin tosylate, pyrrogallol trimesylate, nitrobenzyl-9,10-diethoxyanthracene-2-sulfonate, N-(trifluoromethylsulfonyloxy)succinnimide, N-(trifluoromethylsulfonyloxy)phthalimide, N-(trifluoromethylsulfonyloxy)diphenylmaleide, N-(trifluoromethylsulfonyloxy)bicyclo[2.2.1]hept-5-ene-2,3-dicarboxyimide, and N-(trifluoromethylsulfonyloxy) naphthylimide; diazomethanes, such as bis(trifluoromethylsulfonyl)diazomethane, bis(cyclohexylsulfonyl)diazomethane, bis(phenylsulfonyl)diazomethane, bis(p-tolylsulfonyul)diazomethane, bis(2,4-xylylsulfonyl) diazomethane, bis(p-chlorophenylsulfonyl)diazomethane, methylsulfonyl-p-toluenesulfonyldiazomethane, cyclohexylsulfonyl(1,1-dimethylethylsulfonyl)diazomethane, bis(1,1-dimethylethylsulfonyl)diazomethane, and phenylsulfonyl (benzoyl)diazomethane; carboxylic acid esters; and iron arene complexes.

About the silanol condensing catalyst, two or more different catalyst species may be used together. By using, for example, an amine compound as described above together with a carboxylic acid, the combination can gain an effect of improving the reactivity. The catalyst activity is heightened also by using an acid such as a carboxylic acid with a phosphonium salt compound such as tetrabutylphosphonium hydroxide. The reactivity may be improved by using a halogen-substituted aromatic compound such as pentafluorophenyl or pentafluorobenzaldehyde together with an amine compound.

The use amount of the silanol condensing catalyst is preferably from 0.001 to 20 parts by weight, more preferably from 0.01 to 15 parts by weight, in particular preferably from 0.01 to 10 parts by weight for 100 parts by weight of the total of the reactive-silicon-group-containing polymer, that is, the polymers (A), (B), (C), (D) and (F). If the blend amount of the silanol condensing catalyst is less than 0.001 part by weight, the reaction rate may become insufficient. By contrast, if the blend amount of the silanol condensing catalyst is more than 20 parts by weight, the reaction rate is excessively large so that the period when the composition is usable becomes short. Thus, the composition tends to be deteriorated in workability or storage stability. Furthermore, some silanol condensing catalysts may each exude, after the curable composition is cured, onto the surface of the cured product or pollute the curded product surface. In such a case, by setting the use amount of the silanol condensing catalyst into the range of 0.01 to 2.0 parts by weight, the composition keeps curability and further the surface state of the cured product is kept good.

To the composition of the present invention may be added a silane coupling agent, a reaction product of a silane coupling agent, or a compound other than any silane coupling agent as a tackifier.

Specific examples of the silane coupling agent include amino-group-containing silanes such as γ-aminopropyltrimethoxysilane, γ-aminopropyltriethoxysilane, γ-aminopropyltris(2-propoxy)silane, γ-aminopropylmethyldimethoxysilane, γ-aminopropylmethyldiethoxysilane, N-β-aminoethyl-γ-aminopropyltrimethoxysilane, N-β-aminoethyl-γ-aminopropylmethyldimethoxysilane, N-β-aminoethyl-γ-aminopropyltriethoxysilane, N-β-aminoethyl-γ-aminopropylmethyldiethoxysilane, N-β-aminoethyl-γ-aminopropyltriisopropoxysilane, N-β-(β-aminoethyl)-γ-aminoethyl-γ-aminopropyltrimethoxysilane, N-6-aminohexyl-γ-aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, (aminomethyl)dimethoxymethylsilane, (aminomethyl)trimethoxysilane, (phenylaminomethyl)dimethoxymethylsilane, (phenylaminomethyl)trimethoxysilane, bis(3-trimethoxysilylpropyl)amine, and N,N'-bis[3-(trimethoxysilyl)propyl]ethylenediamine; isocyanate-group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, α-isocyanatomethyltrimethoxysilane, and α-isocyanatomethyldimethoxysilane; mercapto-group-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy-group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis(β-methoxyethoxy)silane and N-β-carboxymethyl)aminoethyl-γ-aminopropyltrimethoxysilane; vinyl-type-unsaturated-group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; isocyanurate silanes such as tris(trimethoxysilyl) isocyanurate; carbamate silanes such as methyl (N-dimethoxymethylsilyl)carbamate, methyl (N-trimethoxysilylmethyl)carbamate, methyl (N-dimethoxymethylsilylpropyl)carbamate, and methyl (N-trimethoxysilylpropyl) carbamate; alkoxy-group-containing silanes such as (methoxymethyl)dimethoxymethylsilane, (methoxymethyl)trimethoxysilane, (ethoxymethyl)trimethoxysilane, and (phenoxymethyl)trimethoxysilane; acid-anhydride-containing silanes such as 3-(trimethoxysilyl)propylsuccinic anhydride, and 3-(triethoxysilyl)propylsuccinic anhydride. Usable examples of the silane coupling agent also include partially condensed products of these silanes, and derivatives obtained by modifying these silanes, such as amino-modified silyl polymers, silylated amino polymers, unsaturated aminosilane complexes, phenylamino long-chain-alkyl silanes, aminosilylated silicones, and silylated polyesters.

These silane coupling agents may be used alone, or may be used in any combination. Reaction products of various silane coupling agents are also usable. Examples of the reaction products include reaction products each made from an isocyanatosilane and a hydroxyl-group-containing compound or an amino-group-containing compound; reaction products each made from an aminosilane and an acrylic-group-containing compound or a methacrylic-group-containing compound (Michael addition reaction products); reaction products each made from an aminosilane and an epoxy-group-containing compound; and reaction products each made from an epoxysilane and a carboxylic-acid-group-containing compound or an amino-group-containing compound. Usable examples of the silane coupling agent also include reaction products each made from silane coupling agents such as an isocyanatosilane and an aminosilane, an aminosilane and a (meth)acrylic-group-containing silane, an aminosilane and an epoxysilane, and an aminosilane and an acid-anhydride-containing silane.

The use amount of the silane coupling agent is preferably from 0.1 to 20 parts by weight, in particular preferably from 0.5 to 10 parts by weight for 100 parts by weight of the whole of the reactive-silicon-group-containing polymer.

Specific examples of the tackifier other than silane coupling agents include epoxy resin, phenol resin, sulfur, alkyl titanate, and aromatic polyisocyanates although the tackifier is not particularly limited thereto. About the tackifier, only a single species thereof may be used, or two or more species thereof may be used in a mixture form. The addition of the tackifier (to the composition) makes it possible to improve the composition in adhesiveness to an adherend.

A plasticizer may be added to the composition of the present invention. The addition of the plasticizer makes it possible to adjust the viscosity and the slump property of the composition, and mechanical properties of a cured product obtained by curing the curable composition, such as the hardness, the tensile strength and the elongation thereof. Specific examples of the plasticizer include phthalate compounds such as dibutyl phthalate, diisononyl phthalate (DINP), diheptyl phthalate, di(2-ethylhexyl) phthalate, diisodecyl phthalate (DIDP), butylbenzyl phthalate; terephthalate compounds such as bis(2-ethylhexyl)-1,4-benzenedicarboxylate (specifically, trade name: EASTMAN 168 (manufactured by Eastman Chemical Co.)); non-phthalate compounds such as diisononyl 1,2-cylohexanedicarboxylate (specifically, trade name: Hexamoll DINCH (manufactured by BASF Corp.); polyhydric aliphatic carboxylic acids such as dioctyl adipate, dioctyl sebacate, dibutyl sebacate, diisodecyl succinate, and tributyl acetylcitrate; unsaturated aliphatic acid ester compounds such as butyl oleate and methyl acetylricinoleate; phenyl alkylsulfonates (specifically, trade name: Mesamoll (manufactured by Lanxess AG); phosphate compounds such as tricresyl phosphate and tributyl phosphate; trimellitate compounds; chlorinated paraffin; alkyldiphenyls, partially hydrogenated terphenyl, and other hydrocarbon oils; process oil; epoxidized soybean oil, benzyl epoxystearate, and other epoxy plasticizers.

A polymeric plasticizer is also usable. The use of the polymeric plasticizer makes it possible to cause the cured product to maintain initial properties over a longer term than the use of any low-molecular-weight plasticizer. The use also makes it possible to improve the dryability (paintability) of an alkyd paint painted onto the cured product. Specific examples of the polymeric plasticizer include vinyl polymers obtained by polymerizing a vinyl monomer by various methods; esters of a polyalkylene, such as diethylene glycol dibenzoate, triethylene glycol dibenzoate, and pentaerythritol esters; polyester plasticizers each obtained from a dibasic acid, such as sebacic acid, adipic acid, azelaic acid or phthalic acid, and a dihydric alcohol, such as ethylene glycol, diethylene glycol, triethylene glycol, propylene glycol or dipropylene glycol; polyethers, such as polyethylene glycol polypropylene glycol having a number-average molecular weight of 500 or more, or 1,000 or more, polytetramethylene glycol, any other polyetherpolyol, or derivatives each obtained by converting hydroxyl groups of such a polyetherpolyol into ester groups or ether groups; polystyrenes such as polystyrene, and poly-α-methylstyrene; and polybutadiene, polybutene, polyisobutylene, butadiene-acrylonitrile, and polychloroprene. A physical property can be given to various polymers by copolymerizing one or more monomers therefor with a reactive-group-containing monomer. For example, it is known that by use of, for example, a polybutadiene into which a maleic acid is grafted, the curable composition or the cured product is improved in adhesiveness-improving effect or elastic recovery factor.

Of these polymeric plasticizers, plasticizers compatible with the polymer (B) are preferred. From this viewpoint, polyether polymers are preferred. The use of a polyether polymer as the plasticizer favorably improves the curable composition in surface curability and depth curability, and causes no curing delay after the composition is stored. Of the polyether polymers, polypropylene glycol is more preferred. In the case of using a plasticizer having a functional group, such as a hydroxyl group, for example, polypropylene glycol, the curable composition may be lowered in curability when stored, and the cured product may be lowered in mechanical properties. However, these problems can be solved, using a compound in which the hydroxyl group is converted into, for example, an alkoxy group. For example, a polypropylene glycol the hydroxyl groups of which have been substituted with allyl groups is preferred since this compound is easily produced. From the viewpoint of compatibility, weather resistance, and heat resistance, vinyl polymers are preferred. Of the vinyl polymers, particularly preferred are acrylic polymers such as polyalkyl (meth) acrylates. The method for synthesizing the polymers is preferably living radical polymerization, more preferably atom transfer radical polymerization since the resultant polymer can be narrow in molecular weight distribution and be made low in viscosity. It is also preferred to use a polymer obtained through the so-called SGO process, in which an alkyl (meth)acrylate monomer is subjected to continuous bulk polymerization at high temperature and high pressure, as described in JP-A-2001-207157.

The number-average molecular weight of the polymeric plasticizer is preferably from 500 to 15,000, more preferably from 800 to 10,000, even more preferably from 1,000 to 8,000, in particular preferably from 1,000 to 5,000, most preferably from 1,000 to 3,000. If the molecular weight is excessively low, the plasticizer elutes out with time by heat or rainfall so that the curable composition or the cured product cannot maintain initial properties over a long term. If the molecular weight is excessively high, the plasticizer is high in viscosity to be deteriorated in workability.

The molecular weight distribution of the polymeric plasticizer is not particularly limited, and is preferably narrow to be less than 1.80. The molecular weight distribution is more preferably 1.70 or less, even more preferably 1.60 or less, even more preferably 1.50 or less, in particular 1.40 or less, most preferably 1.30 or less.

The number-average molecular weight of the polymeric plasticizer is measured by GPC when the plasticizer is a vinyl polymer, and is measured by terminated group analysis when the plasticizer is a polyether polymer. The molecular weight distribution (Mw/Mn) is measured by GPC (in terms of that of polystyrene).

The use amount of the plasticizer is preferably from 5 to 150 parts by weight, more preferably from 10 to 120 parts by weight, in particular from 20 to 100 parts by weight for 100 parts by weight of the total of the polymers (A), (B), (C), (D) and (F). If the use amount is less than 5 parts by weight, the plasticizer comes not to exhibit an advantageous effect thereof. If the amount is more than 150 parts by weight, the cured product is insufficient in mechanical strengths. About the plasticizer, a single species thereof may be used alone, or two or more species thereof may be used together. A low molecular weight plasticizer and a polymeric plasticizer may be used together. When a polymer is produced, the plasticizer(s) may be blended thereinto.

To the composition of the present invention may be added a solvent or diluting agent. The solvent and the diluting agent are not particularly limited, and may each be, for example, an aliphatic hydrocarbon, an aromatic hydrocarbon, an alicyclic hydrocarbon, a halogenated hydrocarbon, an alcohol, an ester, a ketone, or an ether. When the solvent or diluting agent is used, the boiling point of the solvent is preferably 150° C. or higher, more preferably 200° C. or higher, in particular preferably 250° C. or higher against a problem of air pollution when the composition is used indoors. About the solvent or diluting agent, a single species thereof may be used alone, or two or more species thereof may be used together.

To the composition of the present invention may be added a silicate. The silicate acts as a crosslinking agent to have a function of improving a cured product obtained from the curable composition of the present invention in restorability, endurance and creep resistance. The silicate also has an advantageous effect of improving the composition in adhesiveness and water-resistant adhesiveness, and the cured product in adhesion durability under high temperature and high humidity. The silicate may be a tetraalkoxysilane or alkylalkoxysilane, or a partially hydrolyzed condensate of the silane.

Specific examples of the silicate include tetramethoxyisilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, tetra-t-butoxysilane, and other tetraalkoxysilanes (tetraalkyl silicates); and respective partially hydrolyzed condensates of these compounds.

The partially hydrolyzed condensate of the tetraalkoxysilane is more preferred since the compound produces a larger advantageous effect of improving the restorability, durability, and creep resistance in the present invention than the tetraalkoxysilane.

The partially hydrolyzed condensate of the tetraalkoxysilane is, for example, a compound obtained by adding water to the tetraalkoxysilane in an ordinary manner, and then hydrolyzing the resultant partially to be condensed. The partially hydrolyzed condensate of the organosilicate compound may be a commercially available product. Examples of such a condensate include products, METHYL SILICATE 51 and ETHYL SILICATE 40 (manufactured by Colcoat Co., Ltd.).

When the silicate is used, the use amount thereof is from 0.1 to 20 parts by weight, preferably from 0.5 to 10 parts by weight for 100 parts by weight of the total of the polymers (A), (B), (C), (D) and (F).

Various fillers may be blended into the composition of the present invention. Examples of the fillers include reinforcing fillers such as fumed silica, precipitated silica, crystalline silica, fused silica, dolomite, silicic anhydride, hydrated silicic acid, and carbon black; heavy calcium carbonate, colloidal calcium carbonate, magnesium carbonate, diatomaceous earth, calcinated clay, clay, talc, titanium oxide, bentonite, organic bentonite, ferric oxide, fine aluminum powder, flint powder, zinc oxide, active zinc flower, and resin powders such as PVC powder and PMMA powder; and asbestos, glass fiber, filaments, and other fibrous fillers.

As described in JP-A-2001-181532, it is allowable to mix the filler evenly with a dehydrating agent such as calcium oxide, seal the mixture into a bag made of an airtight material, and then allow the bag to stand still for an appropriate period to dehydrate and dry the filler. When the composition of the present invention is rendered a one-pack type composition, the use of this low-water-content filler makes it possible to improve the composition in storage stability.

When a composition high in transparency is obtained, the following is usable as the filler, as described in JP-A-11-302527: a polymeric powder, the raw material of which is a polymer made from, for example, methyl (meth)acrylate; or amorphous silica. Moreover, the composition high in transparency can be obtained by using, as the filler, for example, hydrophobic silica, which is fine silica dioxide powder having a surface to which hydrophobic groups are bonded, as described in JP-A-2000-38560. The surface of fine silicon dioxide powder is generally made of silanol groups (—SiOH). Hydrophobic silica is a substance in which an organic silicon halide compound, an alcohol or the like is caused to react with the silanol groups to produce "—SiO-hydrophobic groups". Specifically, hydrophobic silica is a substance obtained by causing, for example, dimethylsiloxane, hexamethyldisilazane, dimethyldichlorosilane, trimethoxyoctylsilane, or trimethylsilane to react with silanol groups present on the surface of fine silicon dioxide powder. For reference, fine silicon dioxide powder having a surface made of silanol groups (—SiOH) is called fine hydrophilic silica powder.

In the case of desiring to yield a cured product high in strength using such a filler, it is preferred to use a filler selected from fumed silica, precipitated silica, crystalline silica, fused silica, dolomite, silicic anhydrate, hydrated silicic acid, carbon black, surface-treated fine calcium carbonate, calcinated clay, clay, and active zinc flower. A nano filler having a particle diameter of about 1 to 100 nm is also usable. The use amount thereof is preferably from 1 to 200 parts by weight for 100 parts by weight of the total of the polymers (A), (B), (C), (D) and (F).

In the case of desiring to yield a cured product low in strength and large in breaking elongation, a favorable result is obtained mainly by using a filler selected from titanium oxide, heavy calcium carbonate, other calcium carbonate species, magnesium carbonate, talc, ferric oxide, zinc oxide, volcanic soil balloons, and others in an amount of 5 to 200 parts by weight for 100 parts by weight of the polymers (A), (B), (C), (D) and (F). As calcium carbonate is larger in specific surface area, the resultant cured product is in general more largely improved in breaking strength, breaking elongation, and adhesiveness. In the case of using calcium carbonate, it is desired to use surface-treated fine calcium carbonate together with a calcium carbonate species large in particle diameter, such as heavy calcium carbonate. The particle diameter of the surface-treated fine calcium carbonate is preferably 0.5 μm or less. The surface treatment is preferably conducted with an aliphatic acid or an aliphatic acid salt. The particle diameter of the calcium carbonate species large in particle diameter is preferably 1 μm or more, and a non-surface-treated species is usable as this species. Examples of a surface treating agent for producing the surface-treated calcium carbonate powder include aliphatic acids and unsaturated aliphatic acids, typically, palmitic acid, caprylic acid, capric acid, lauric acid, stearic acid, arachidic acid, behenic acid, lignoceric acid, oleic acid, linoleic acid and linolenic acid; rosin acid compounds and other carboxylic acids, and esters thereof; silane compounds such as hexamethyldisilazane, chlorosilane, and aminosilane; and paraffin compounds. However, the surface treating agent is not limited to these compounds. It is preferred that the surface treating agent is a carboxylic acid out of these examples since in the case of preparing a curable silicon resin composition, curing delay is less easily caused. The carboxylic acid is in particular preferably a saturated aliphatic acid or unsaturated aliphatic acid since the curing delay is even less easily caused. Of course, these fillers may be used alone or in the form of a mixture of two or more thereof. It is allowable to use an aliphatic-acid-surface-treated colloidal calcium carbonate together with a calcium carbonate species having a particle diameter of 1 μm or more, such as non-surface-treated heavy calcium carbonate.

The use amount of the filler is preferably from 1 to 300 parts by weight, in particular preferably from 10 to 200 parts by weight for 100 parts by weight of the total of the polymers (A), (B), (C), (D) and (F).

In order to improve the composition in workabilities (such as anti-dripping property) or make the surface of the cured product into a mat or delustered state, it is preferred to add organic balloons or inorganic balloons thereto. These fillers may be surface-treated. About these fillers, only one species thereof may be used, or two or more species thereof may be used in a mixture form. For the improvement in the workabilities (such as the anti-dripping property), the particle diameter of the balloons is preferably 0.1 mm or less. In order to make the cured product surface mat, the particle diameter is preferably from 5 to 300 μm.

The composition of the present invention is favorably used for joints for sizing boards, in particular, ceramic sizing boards, and other housing external walls; an adhesive for external wall tiles; and an adhesive for external wall tiles that remains as it is in joints between the tiles; and others. It is desired that the design of the external walls is matched with that of the sealing material. In particular, as the external walls, high-quality external walls based on sputtering paint, the incorporation of aggregates, or some other treatment have been being used. When the composition of the present invention is a composition with which a substance in the form of scales or granules having a diameter of 0.1 mm or more, preferably from about 0.1 to 5.0 mm is blended, this composition is an excellent composition which gives a cured product matchable with such high-quality external walls and is excellent in chemical resistance. Thus, the external appearance of this cured product sustains over a long term. By use of the granular substance, the surface of the cured product comes to have a coarse feel in a scattered sand tone or sandstone tone. By use of the scaly substance, the composition comes to have an irregular surface resulting from the scaly form.

As described in JP-A-09-53063, preferred examples of the diameter, the blend amount, the material and others of the scaly or granular substance are as follows: The diameter is 0.1 mm or more, preferably from about 0.1 to 5.0 mm, and may be an appropriate diameter matchable with the material, the pattern and others of the external walls. The diameter may be from about 0.2 to 5.0 mm, or from about 0.5 to 5.0 mm. About the scaly substance, the thickness is set into the range of about ⅒ to ⅕ of the diameter (thickness: about 0.01 to 1.00 mm). The scaly or granular substance is beforehand blended into the main sealing material, and then carried as a sealing material to an application spot, or the substance is blended into the main sealing material in an application spot when used.

The scaly or granular substance is blended in an amount of about 1 to 200 parts by weight for 100 parts by weight of the composition for a sealing material, an adhesive or some other. The blend amount is appropriately selected in accordance with the size of individual pieces or granules of the scaly or granular substance, the material and the pattern of the external walls, and other factors.

The scaly or granular substance may be a natural substance such as silica sand or mica, a synthetic rubber, a synthetic resin, or an inorganic substance such as alumina. The substance is colored into an appropriate color in accordance with the material and the pattern of the external walls, and other factors in order to be improved in design property when filled into a joint region (between the walls).

Preferred examples of the method for finishing the curable composition or the cured product, and others are described in JP-A-09-53063.

For the same purpose, balloons (preferably, balloons having an average particle diameter of 0.1 mm or more) may be used; in this case, the surface of the cured product comes to have a coarse feeling in a scattered sand tone or sandstone tone, and further the product can be made light. Preferred examples of the diameter, the blend amount, the material and others of the balloons are as described in JP-A-10-251618.

The balloons are spherical fillers having a hollow inside. The balloons may be added to make the composition light (make the specific gravity thereof low). Examples of the material of the balloons include inorganic materials such as glass, volcanic soil, and silica; and organic materials such as phenol resin, urea resin, polystyrene, and saran. The material is not limited to only these materials. Thus, an inorganic material and an organic material may be composited with each other, or laminated onto each other to form plural layers. Inorganic balloons, inorganic balloons, or balloons in which, for example, these are composited with each other are usable. The used balloons may be composed of the same balloon species, or of a mixture in which different balloon species are mixed with each other. The balloons may be surface-processed or surface-coated balloons, or balloons surface-treated with a surface treating agent that may be of various types. Examples thereof include organic balloons coated with, for example, calcium carbonate, talc or titanium oxide, and inorganic balloons surface-treated with a silane coupling agent.

In order for the surface to gain a coarse feeling in a scattered sand tone or sandstone tone, the particle diameter of the balloons is preferably 0.1 mm or more. The particle diameter may be from about 0.2 to 5.0 mm, or from about 0.5 to 5.0 mm. If the particle diameter is less than 0.1 mm, the composition is merely raised in viscosity even by the incorporation of a large proportion of the balloons, so that the coarse feeling may not be exhibited. The blend amount of the balloons can easily be decided in accordance with a target degree of the coarse feeling in the scattered sand tone or sandstone tone. It is usually desired to incorporate balloons having a particle diameter of 0.1 mm or more into the composition in a concentration of 5 to 25% by volume of the composition. If the concentration by volume of the balloons is less than 5% by volume, no coarse feeling is produced. If the concentration is more than 25% by volume, the sealing material or adhesive is high in viscosity to be deteriorated in workability, and the cured product is also high in modulus. In short, basic performances of the sealing material or adhesive tend to be damaged. The concentration by volume of the sealing material is in particular preferably from 8 to 22% by volume for a balance between the basic performances of the sealing material.

When the balloons are used, the following may be added (to the composition): a slip inhibitor as described in JP-A-

2000-154368; or an amine compound for making the surface of the cured product into a mat state as well as in the irregularity state, in particular, a primary amine and/or a secondary amine having a melting point of 35° C. or higher, as described in JP-A-2001-164237.

Specific examples of the balloons are described in JP-A-02-129262, JP-A-04-8788, JP-A-04-173867, JP-A-05-1225, JP-A-07-113073, JP-A-09-53063, JP-A-10-251618, JP-A-2000-154368 and JP-A-2001-164237, WO 97/05201, and other publications.

Thermally expansible fine hollow particles are usable, which are described in JP-A-2004-51701, JP-A-2004-66749, and others. The thermally expansible fine hollow particles are each a plastic sphere in which a low-boiling-point compound, such as a hydrocarbon having 1 to 5 carbon atoms, is wrapped into a spherical form with a polymeric shell material (vinylidene chloride based copolymer, acrylonitrile based copolymer, or vinylidene chloride-acrylonitrile copolymer). By heating a bonding region using the present composition, the pressure of a gas inside the shells of the thermally expansible fine hollow particles is increased to soften the polymeric shell material, so that the particles are drastically increased in volume. Thus, a function of peeling the bonding interfaces from each other is fulfilled. The addition of the thermally expansible fine hollow particles makes it possible to yield, without using any organic solvent, an adhesive composition peelable by heating. The composition is a composition that can easily be peeled only by heating, without breaking the material of the composition, when the composition is unnecessary.

Also when the composition of the present invention contains sealing-material-cured particles, irregularities are formed in the surface of the cured product. Thus, the cured product can be improved in design property. As described in JP-A-2001-115142, preferred examples of the diameter, the blend amount, the material and others of the sealing-material-cured particles are as follows: The diameter is preferably from about 0.1 to 1 mm, more preferably from about 0.2 to 0.5 mm. The blend amount is preferably from 5 to 100% by weight, more preferably from 20 to 50% by weight of the composition. Examples of the material include urethane resins, silicone resins, modified silicones, and polysulfide rubbers. The material is not limited as far as the material is a material usable for sealing material. A sealing material of a modified silicone type is preferred.

A drip inhibitor may be optionally added to the composition of the present invention to prevent the composition from dripping to make the workability thereof good. The drip inhibitor is not particularly limited. Examples thereof include polyamide waxes; hydrogenated castor oil derivatives; and metal soaps such as calcium stearate, aluminum stearate, and barium stearate. A composition high in thixotropy and good in workability is obtained, using a rubber powder having a particle diameter of 10 to 500 μm as described in JP-A-11-349916, or an organic fiber as described in JP-A-2003-155389. These drip inhibitors may be used alone, or in any combination of two or more thereof.

The use amount of the drip inhibitor is preferably from 0.1 to 20 parts by weight for 100 parts by weight of the total of polymers (A), (B), (C), (D) and (F).

An antioxidant (anti-ageing agent) is usable in the composition of the present invention. The use of the antioxidant makes it possible to heighten the cured product in weather resistance. Examples of the antioxidant include hindered phenolic, monophenolic, bisphenolic, and polyphenolic antioxidants. The hindered phenolic antioxidants are particularly preferred. Equivalently, a hindered amine light stabilizer is usable, examples thereof including TINUVIN 622LD, TINUVIN 144, CHIMASSORB 944LD, and CHIMASSORB 119FL (each manufactured by Ciba Japan K.K.); ADEKASTAB LA-57, ADEKASTAB LA-62, ADEKASTAB LA-67, ADEKASTAB LA-63, and ADEKASTAB LA-68 (each manufactured by Adeka Corp.); and SANOL LS-770, SANOL LS-765, SANOL LS-292, SANOL LS-2626, SANOL LS-1114, and SANOL LS-744 (each manufactured by Sankyo Lifetech Co., Ltd.). Specific examples of the antioxidant are also described in JP-A-04-283259 and JP-A-09-194731.

The use amount of the antioxidant is preferably from 0.1 to 10 parts by weight, in particular preferably from 0.2 to 5 parts by weight for 100 parts by weight of the total of the polymers (A), (B), (C), (D) and (F).

A light stabilizer is usable in the composition of the present invention. The use of the light stabilizer makes it possible to prevent the cured product from being deteriorated by optical oxidization. Examples of the light stabilizer include benzotriazole, hindered amine, and benzoate compounds. The hindered amine compounds are particularly preferred.

The use amount of the light stabilizer is preferably from 0.1 to 10 parts by weight, in particular preferably from 0.2 to 5 parts by weight for 100 parts by weight of the polymers (A), (B), (C), (D) and (F).

When an optically curable substance is blended into the composition of the present invention and, in particular, an unsaturated acrylic compound is used as this substance, it is preferred to use, as a hindered amine light stabilizer, a tertiary-amine-containing hindered amine light stabilizer as described in JP-A-05-70531 in order to improve the composition in storage stability. Examples of the tertiary-amine-containing hindered amine light stabilizer include light stabilizers such as TINUVIN 622LD, TINUVIN 144, and CHIMASSORB 119FL (each manufactured by Ciba Japan K.K.); ADEKASTAB LA-57, ADEKASTAB LA-62, ADEKASTAB LA-67, and ADEKASTAB LA-63 (each manufactured by Adeka Corp.); and SANOL LS-765, SANOL LS-292, SANOL LS-2626, SANOL LS-1114, and SANOL LS-744 (each manufactured by Sankyo Lifetech Co., Ltd.).

An ultraviolet absorbent is usable in the composition of the present invention. The use of the ultraviolet absorbent makes it possible to heighten the cured product in surface weather resistance. Examples of the ultraviolet absorbent include benzophenone, benzotriazole, salicylate, substituted tolyl, and metal chelate compounds. The benzotriazole compounds are particularly preferred, and examples thereof include TINUVIN P, TINUVIN 213, TINUVIN 234, TINUVIN 326, TINUVIN 327, TINUVIN 328, TINUVIN 329, and TINUVIN 571 (each manufactured by Ciba Japan K.K.). Particularly preferred are 2-(2H-1,2,3-benzotriazole-2-yl)-phenolic compounds. It is preferred to use a phenolic or hindered phenolic antioxidant, a hindered amine light stabilizer, and a benzotriazole ultraviolet absorbent together.

The use amount of the ultraviolet absorbent is preferably from 0.1 to 10 parts by weight, in particular from 0.2 to 5 parts by weight for 100 parts by weight of the total of the polymers (A), (B), (C), (D) and (F).

A physical property adjustor may be optionally added to the curable composition of the present invention to adjust tensile properties of the resultant cured product. The physical property adjustor is not particularly limited. Examples thereof include alkylalkoxysilanes such as phenoxytrimethylsilane, methyltrimethoxysilane, dimethyldimethoxysilane, trimethylmethoxysilane, and n-propyltrimethoxysilane; arylalkoxysilanes such as diphenyldimethoxysilane and phenyltrimethoxysilane; alkylisopropenoxysilanes such as dimethyldiisopropenoxysilane, methyltriisopropenoxysilane, and γ-glycidoxypropylmethyldiisopropenoxysilane; trialkylsilyl borates such as tris(trimethylsilyl) borate and tris(triethylsilyl) borate; silicone vanishes; and polysiloxanes. The use of the physical property adjustor makes it possible to raise the hardness obtained when the composition of the present invention is cured, or contrarily lower the hardness to exhibit breaking elongation. The above-mentioned physical property adjustors may be used alone, or in any combination of two or more thereof.

In particular, a compound which undergoes hydrolysis to produce a compound having, in the molecule thereof, a monovalent silanol group has an effect of lowering the modulus of the cured product without deteriorating the stickiness of the cured product. Particularly preferred is a compound which produces trimethylsilanol. Examples of the compound which undergoes hydrolysis to produce a compound having, in the molecule thereof, a monovalent silanol group are described in JP-A-05-117521. Other examples thereof include any compound that is a derivative of an alkylalcohol such as hexanol, octanol or decanol, and that undergoes hydrolysis to produce a silicon compound which produces a silane monool such as trimethylsilanol; and any compound that is a derivative of a polyhydric alcohol having 3 or more hydroxyl groups, such as trimethylolpropane, glycerin, pentaerythritol or sorbitol, and that undergoes hydrolysis to produce a silicon compound which produces a silane monool, as described in JP-A-11-241029.

Other examples thereof include any compound that is a derivative of an oxypropylene polymer, and that undergoes hydrolysis to produce a silicon compound which produces a silane monool, as described in JP-A-07-258534; and any organic polymer having a crosslinkable and hydrolyzable silicon-containing group, and a silicon-containing group that can undergo hydrolysis to be converted to a monosilanol-containing compound, as described in JP-A-06-279693.

The compound having an effect of lowering the modulus of the cured product may be a trialkylsilyl borate, such as tris(trimethylsily) borate or tris(triethylsilyl) borate.

A tackifier may be added to the present invention to heighten the composition in adhesiveness or adhesiveness onto a substrate, or attain a different required purpose. The tackifier is not particularly limited, and may be an ordinarily used tackifier.

Specific examples thereof include terpene resin, aromatic modified terpene resin and hydrogenated terpene resin obtained by hydrogenating this resin, terpene-phenol resin obtained by copolymerizing a terpene with a phenolic compound, phenol resin, modified phenol resin, xylene-phenol resin, cyclopentadiene-phenol resin, coumarone indene resin, rosin resin, rosin ester resin, hydrogenated rosin ester resin, xylene resin, low-molecular-weight polystyrene resin, styrene copolymer resin, petroleum resins (such as C5 hydrocarbon resin, C9 hydrocarbon resin, and C5C9-hydrocarbon-copolymerized resin), hydrogenated petroleum resins, and DCPD resin. These resins may be used alone or in any combination of two or more thereof.

The styrene copolymer resin that is a styrene block copolymer, and a hydrogenated product thereof are not particularly limited. Examples thereof include styrene-butadiene-styrene block copolymer (SBS), styrene-isoprene-styrene block copolymer (SIS), styrene-ethylene/butylene-styrene block copolymer (SEBS), styrene-ethylene/propylene-styrene block copolymer (SEPS), and styrene-isobutylene-styrene block copolymer (SIBS).

Of these examples, terpene-phenol resin is preferred since the resin is highly compatible with the polymer (A) to give a high adhesive effect. When the color tone is important, hydrocarbon resin is preferred.

The use amount of the tackifier is preferably from 2 to 100 parts by weight, more preferably from 5 to 50 parts by weight, even more preferably from 5 to 30 parts by weight for 100 parts by weight of the total of the polymers (A), (B), (C), (D) and (F). If the amount is less than 2 parts by weight, the composition does not easily gain a bonding or adhesive effect onto a substrate. If the amount is more than 100 parts by weight, the composition is excessively high in viscosity to be difficult to handle.

An epoxy-group-containing compound is usable in the composition of the present invention. The use of the epoxy-group-containing compound makes it possible to heighten the restorability of the cured product. Examples of the epoxy-group-containing compound include epoxidized unsaturated oils and fats, epoxidized unsaturated aliphatic acid esters, alicyclic epoxy compounds and epichlorohydrin derivatives; and mixtures thereof. Specific examples thereof include epoxidized soybean oil, epoxidized linseed oil, bis(2-ethylhexyl)-4,5-epoxycyclohexane-1,2-dicarboxylate (E-PS), epoxyoctyl stearate, and epoxybutyl stearate. Of these examples, E-PS is particularly preferred. The epoxy compound is used preferably in an amount of 0.5 to 50 parts by weight for 100 parts by weight of the total of the polymers (A), (B), (C), (D) and (F).

An optically curable substance is usable in the composition of the present invention. The use of the optically curable substance makes it possible to form a coat made from the optically curable substance onto the surface of the cured product to solve or improve the stickiness or the weather resistance of the cured product. The optically curable substance is a substance that is chemically changed in molecular structure, in a considerably short period, by effect of light, so as to be cured or changed in physical property. As a compound of this sort, many substances are known. Examples thereof include organic monomers, oligomers, and resins; and compositions each containing one or more thereof. Any commercially available optically curable substance is adoptable. Typical examples thereof include any unsaturated acrylic compound, any polyvinyl cinnamate, and any azidated resin.

The unsaturated acrylic compound is, for example, a monomer, an oligomer, or a mixture of the two that has one to several acrylic or methacrylic unsaturated groups, and that is a monomer or an oligoester which has a molecular weight of 10,000 or less and which is or is made from propylene (or butylene or ethylene) glycol di(meth)acrylate, neopentyl glycol di(meth)dimethacrylate or some other. Specific examples thereof include especial (bifunctional)acrylates, such as products ARONIXes M-210, M-215, M-220, M-233, M-240, and M-245; (trifunctional) products ARONIXes M305, M-309, M-310, M-315, M-320, and M-325; and (polyfunctional) products ARONIX M-400. Preferred are such compounds each having an acrylic functional group, and particularly preferred are such compounds each having 3 or more acrylic functional groups on average per molecule of the compound (the products ARONIXes are each manufactured by Toagosei Co., Ltd.).

Examples of the polyvinyl cinnamate include a photosensitive resin obtained by esterifying a polyvinyl alcohol with cinnamic acid to have cinnamoyl groups as photosensitive groups, and many other polyvinyl cinnamate derivatives. The azidated resin is known as a photosensitive resin having azide groups as photosensitive groups. The azidated resin is usually a photosensitive rubbery liquid into which a diazide compound is added as a photosensitizer. Detailed examples thereof are described in "Photosensitive Resin" (edited on Mar. 17, 1972 and published by Insatsu Gakkai Shuppanbu Ltd., p. 93 and thereafter, p. 106 and thereafter, and p. 117 and thereafter). These may be used alone or in a mixture form in the state that a sensitivity intensifier is optionally added thereto. The addition of a ketone, a nitro compound or such a sensitivity intensifier, or a promoter such as an amine may enhance the advantageous effects.

It is advisable to use the optically curable substance in an amount of 0.1 to 20 parts by weight, preferably 0.5 to 10 parts by weight for 100 parts by weight of the total of the polymers (A), (B), (C), (D) and (F). If the amount is 0.1 parts or less by weight, the substance does not produce any effect of enhancing the weather resistance. If the amount is 20 parts or more by weight, the cured product tends to be excessively hard and be cracked.

An oxygen curable substance is usable in the composition of the present invention. The oxygen curable substance is, for example, an unsaturated compound reactive in oxygen in air, and shows an effect of reacting oxygen in air to form a cured coat in the vicinity of the surface of the cured product to prevent the stickiness of the surface or the adhesion of stain and dust onto the cured product surface, and other effects. Specific examples of the oxygen curable substance include dry oils such as tung oil and linseed oil, and various alkyd resins each obtained by modifying such a compound; acrylic polymers, epoxy resins, and silicone resins each modified with a dry oil; 1,2-polybutadiene, 1,4-polybutadiene, C5-C8 diene polymers, and such liquid polymers, which are each obtained by polymerizing or copolymerizing a diene compound such as butadiene, chloroprene, isoprene or 1,3-pentadiene; NBR, SBR, and such liquid copolymers, which are each obtained by copolymerizing such a diene compound with acrylonitrile, styrene or any other monomer copolymerizable with the diene compound to render the diene compound main portions of the polymer; and various modified products of these examples (such as maleic-acid-modified products and boiled oil modified products). These may be used alone, or in any combination of two or more thereof. Of these examples, tung oil and liquid diene polymers are particularly preferred. The advantageous effect may be enhanced by using the curable composition together with a catalyst for promoting the oxidization curing reaction, or a metal drier. Examples of the catalyst or the metal drier include metal salts such as cobalt naphthenate, lead naphthenate, zirconium naphthenate, cobalt octylate, and zirconium octylate; and amine compounds.

The oxygen curable substance is used in an amount preferably from 0.1 to 20 parts by weight, more preferably from 0.5 to 10 parts by weight for 100 parts by weight of the polymers (A), (B), (C), (D) and (F). If this use amount is less than 0.1 parts by weight, the stain resistance is not sufficiently improved. If the amount is more than 20 parts by weight, tensile properties and others of the cured product tend to be damaged. As described in JP-A-03-160053, it is advisable to use the oxygen curable substance together with the optically curable substance.

A surface property improver may be added to the composition of the present invention. Examples of the surface property improver include long-chain alkylamines such as luarylamine; phosphorous compounds such as 2,2'-methylenebis(4,6-di-t-butylphenyl)sodium phosphate, and tris(2,4-di-t-butylpenyl) phosphate; and oxazolidine compounds.

The polymer (B) and an epoxy resin may be used together in the composition of the present invention. The epoxy-resin-added composition is preferred particularly for adhesives, above all, for adhesives for external wall tiles. Examples of the epoxy resin include flame retardant epoxy resins such as epichlorohydrin-bisphenol A type epoxy resin, epichlorohydrin-bisphenol F type epoxy resin and glycidyl ether of tetrabromobisphenol A, novolak type epoxy resin, hydrogenated bisphenol A type epoxy resin, glycidyl ether type epoxy resin of an bisphenol A propylene oxide adduct, p-oxybenzoic acid glycidyl ether ester type epoxy resin, m-aminophenolic epoxy resin, diaminodiphenylmethane type epoxy resin, urethane-modified epoxy resin, various alicyclic epoxy resins, N, N-diglycidylaniline, N,N-diglycidyl-o-toluidine, triglycidyl isocyanurate, glycidyl ethers of a polyhydric alcohol, such as polyalkylene glycol diglycidyl ether and glycerin, hydantoin type epoxy resin, and an epoxidized product of any unsaturated polymer such as petroleum resin. However, the epoxy resin is not limited to these resins. The epoxy resin may be an ordinarily used epoxy resin. Preferred is an epoxy resin having, in the molecule thereof, at least two epoxy groups since the resin is highly reactive when cured, and further the cured product easily forms therein a three-dimensional network structure. More preferred is any bisphenol A type epoxy resin or novolak type epoxy resin.

About the use ratio between the epoxy resin and the polymer (B), the ratio by weight of the polymer (B) to the epoxy resin is from 100/1 to 1/100. If the ratio of the polymer (B) to the epoxy resin is less than 1/100, an effect of improving the epoxy resin cured product in impact strength or toughness is not easily obtained. If the ratio of the polymer (B) to the epoxy resin is more than 100/1, the polymer cured product is insufficient in strength. A preferred value of the use ratio is not decided without reservation since the value is varied in accordance with the usage of the curable resin composition, and other factors. When the epoxy resin cured product is improved in, for example, impact resistance, flexibility, toughness, peel strength and others, the component (B) is used in an amount preferably from 1 to 100 parts by weight, more preferably from 5 to 100 parts by weight for 100 parts by weight of the epoxy resin. When the cured product is improved in strength, the epoxy resin is used in an amount preferably from 1 to 200 parts by weight, more preferably from 5 to 100 parts by weight for 100 parts by weight of the component (B).

In the case of the addition of the epoxy resin, it is natural to use a curing agent for curing the epoxy resin in the composition of the present invention. A usable species of the epoxy resin curing agent is not particularly limited, and may be an ordinarily used epoxy resin curing agent. Specific examples thereof include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and amine-terminated polyethers; tertiary amines such as 2,4,6-tris(dimethylaminomethyl)phenol and tripropylamine, and salts of these tertiary amines; polyamide resins; imidazoles; dicyandiamines; trifluoroboron complex compounds; carboxylic acid anhydrides such as phthalic anhydride, hexafluorophthalic anhydride, tetrahydrophthalic anhydride, dodecinylsuccinic anhydride, pyromellitic anhydride, and chlorenic anhydride; alcohols; phenols; carboxylic acids; and diketone complex compounds of aluminum or zirconium. However, the epoxy resin curing agent is not limited to these compounds. These curing agents may be used alone, or in any combination of two or more thereof.

When the epoxy resin curing agent is used, the use amount thereof ranges from 0.1 to 300 parts by weight for 100 parts by weight of the epoxy resin.

The epoxy resin curing agent may be a ketimine. The ketimine is stably present in the absence of water, and is decomposed into a primary amine and a ketone by water so that the resultant primary amine functions as a room-temperature-curable curing agent for epoxy resin. The use of the ketimine makes it possible to yield a one-pack type composition. The ketimine can be obtained by condensation reaction between an amine compound and a carbonyl compound.

It is sufficient for the synthesis of the ketimine that a known amine compound and carbonyl compound are used. Examples of the amine compound include diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, and p,p'-biphenylenediamine; polyhydric amines such as 1,2,3-triaminopropane, triaminobenzene, tris(2-aminoethyl)amine, and tetra(aminomethyl)methane; polyalkylene polyamines such as diethylenetriamine, triethylenetriamine, and tetraethylenepentamine; polyoxyalkylene polyamines; and aminosilanes such as γ-aminopropyltriethoxysilane, N-(β-aminoethyl)-γ-aminopropyltrimethoxysilane, and N-(β-aminoethyl)-γ-aminopropylmethyldimethoxysilane. Examples of the carbonyl compound include aldehydes such as acetoaldehyde, propionaldehyde, n-butylaldehyde, isobutylaldehyde, diethylacetoaldehyde, glyoxal, and benzaldehyde; cyclic ketones such as cyclopentanone, trimethylcyclopentanone, cyclohexanone, and trimethylcyclohexanone; and aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, and diisobutyl ketone; and β-dicarbonyl compounds such as acetylacetone, methyl acetoacetate, ethyl acetoacetate, dimethyl malonate, diethyl malonate, methyl ethyl malonate, and dibenzoylmethane.

When an imino group is present in the ketimine, the imino group may be caused to react with styrene oxide; a glycidyl ether such as butyl glycidyl ether or allyl glycidyl ether; or a glycidyl ester.

The above-mentioned ketimines may be used alone or in any combination of two or more thereof. The ketimine is used in an amount of 1 to 100 parts by weight for 100 parts by weight of the epoxy resin. The use amount is varied in accordance with the kind of the epoxy resin and the ketimine.

A flame retardant may be added to the composition of the present invention. Examples of the flame retardant include phosphorous-containing plasticizers such as polyammonium phosphate and tricresyl phosphate, aluminum hydroxide, magnesium hydroxide, and thermally expandable graphite. These flame retardants may be used alone or in any combination of two or more thereof.

The flame retardant is used in an amount from 5 to 200 parts by weight, preferably from 10 to 100 parts by weight for 100 parts by weight of the total of the polymers (A), (B), (C), (D) and (F).

A foaming agent is used in the composition of the present invention, whereby the composition is usable as a foaming material. As, for example, a spraying agent for aerosol, a liquefied gas is usable which is butane, propane, ethane, methane, dimethyl ether or some other. A compressed gas may be used which is made of air, oxygen, nitrogen, carbon dioxide or some other. As a hydrocarbon solvent having a boiling point ranging from 10 to 100° C., a spraying agent containing pentane, hexane or heptane is usable. As a foam adjustor, siloxane/oxyalkylene copolymer is usable. The use volume of the foaming agent may be from 5 to 100 mL, preferably from 5 to 50 mL, even more preferably from 5 to 20 mL for 100 g of the total of the polymers (A), (B), (C), (D) and (F).

Various additives may be optionally added to the curable composition of the present invention to adjust various physical properties of the curable composition or the cured product. Examples of the additives include a curability adjustor, a radical inhibitor, a metal inactivating agent, an ozone-deterioration preventer, a phosphorous-containing peroxide decomposer, a lubricant, a pigment, and an anti-fungal agent. These additives may be used alone or in any combination of two or more thereof. Specific examples other than the specific examples of the additives, which have been described in the present specification, are described in, for example, JP-B-04-69659, JP-B-07-108928, JP-A-63-254149, JP-A-64-22904, JP-A-2001-72854, and others.

A curable composition containing the polymer (B) of the present invention can be prepared in such a one-pack form that all of its blend components are airtightly sealed and stored in advance and after the application of the composition the composition is cured by moisture in air. The composition may be prepared in such a two-pack form that a curing catalyst, a filler, a plasticizer, water and others are blended with each other separately as a curing preparation, and the organic polymer composition is mixed with the blended materials before used. From the viewpoint of workability, the one-pack form is preferred.

When the curable composition is in the one-pack form, all of the blend components are beforehand blended with each other; thus, when any one of the blend components contains water, it is preferred to dehydrate and dry the component beforehand and then use the composition, or dehydrate the component by, for example, pressure-reduction while the component is incorporated or kneaded. When the curable composition is in the two-pack form, it is unnecessary to blend a silanol condensing catalyst with the main agent including the reactive-silicon-group-containing organic polymer. Thus, even when the blend preparation contains a slight volume of water, it is hardly feared that this blend substance is raised in viscosity or gelatinized. However, when the two-pack form curable composition requires storage stability over a long term, it is preferred to dehydrate and dry the composition. The method for the dehydrating and drying is preferably a drying method by heating when the composition is in the form of a solid such as powder, and is preferably a dehydrating method under reduced pressure, or a dehydrating method using synthesized zeolite, activated alumina, silica gel, caustic lime, magnesium oxide or some other when the composition is in the form of liquid. It is also allowable to blend a small volume of an isocyanate compound (into the composition) to cause its isocyanate group to react with water, thereby attaining the dehydration. It is also allowable to blend an oxazolidine compound such as 3-ethyl-2-methyl-2-(3-methylbutyl)-1,3-oxazolidine (into the composition) to cause the compound to react with water, thereby attaining the dehydration. By not only performing such a dehydrating method but also adding the following (to the composition), the storage stability is further improved: a lower alcohol such as methanol or ethanol; or an alkoxysilane compound such as n-propyltrimethoxysilane, vinyltrimethoxysilane, vinylmethyldimethoxysilane, γ-mercaptopropylmethyldimethoxysilane, γ-mercaptopropylmethyldiethoxysilane, or γ-glycidoxypropyltrimethoxysilane. This manner makes a further improvement in the storage stability.

The use amount of such a dehydrator, in particular, a silicon compound reactive with water, such as vinyltrimethoxysilane, is preferably from 0.1 to 20 parts by weight, more preferably from 0.5 to 10 parts by weight for 100 parts by weight of the total of the organic polymers (A), (B), (C), (D) and (F) having reactive silicon group(s).

The method for preparing the composition of the present invention is not particularly limited, and may be an ordinary method, for example, a method of blending the above-mentioned components with each other, and using a mixer, a roll, a kneader or some other to knead the mixture at normal temperature or under a mixture-heated condition, or a method of using an appropriate solvent in a small amount to dissolve the components, and mixing the components with each other.

A composition containing the polymer (B) of the present invention is a moisture-reactive type composition, in which reaction is advanced by water. The composition can also be used as a dual curable composition, in which the polymer-(B)-containing composition is used together with a thermally curable resin, optically curable resin, or radical ray curable resin. Specifically, a curable resin is together usable which makes use of, for example, ene-thiol addition reaction, radical polymerization reaction of (meth)acrylic groups, ring-opening polymerization reaction of epoxy groups, addition reaction through hydrosilylation, or urethanization reaction. For example, the polymer (A) of the present invention is curable, using ene-thiol addition reaction or addition reaction through hydrosilylation.

The composition (of any one of the aspects) of the present invention is suitable for being used as a curable composition or a sticky or adhesive composition, and is usable for a sticker, a sealing material for buildings, ships, automobiles, roads and others, an adhesive, a waterproof material, a painted film waterproof material, a mold making agent, a vibration proof material, a damping material, a soundproof material, a foaming material, a paint, a spraying material, and others. A cured product obtained by curing each of the curable compositions of the present invention is excellent in softness and adhesiveness, and thus the product is more preferably used as a sealing material or adhesive out of the above-mentioned articles.

The composition of the present invention is usable for various articles, such as electrical/electronic part materials such as a solar battery rear-surface sealing material, electrical/electronic parts such as an insulating coat material for electric wires/cables, electrically insulating materials for devices, acoustic insulating materials, elastic adhesives, binders, contact-type adhesives, spraying-type sealing materials, crack repairing materials, adhesives for tiling, adhesives for asphalt waterproof materials, powder paints, casting materials, rubbery materials for medical care, stickers for medical care, adhesive sheets for medical care, medical machine sealing materials, dental impression materials, food wrapping materials, sealing materials for joints between exterior members such as sizing boards, coating materials, slip-preventing coating materials, buffer materials, primers, electromagnetic wave shielding electroconductive materials, thermoconductive materials, hot melt materials, electrical/electronic potting agents, films, gaskets, concrete reinforcing materials, adhesives for pre-adhesion, various molding materials, antirust and waterproof sealing materials for end surfaces (cut regions) of a wire-reinforced glass piece or laminated glass piece, and liquid sealing agents used for automobile parts, parts of large vehicles such as trucks and buses, train vehicle parts, aircraft parts, ship parts, electrical machinery parts, and various mechanical parts, and others. When automobiles are given as an example, the composition is usable for various purposes, such as the attachment of plastic covers, trims, flanges, bumpers or windows, and the bonding and attachment of interior parts or exterior parts. The composition is also usable as various sealing compositions and bonding compositions since the composition can be caused, by itself or by aid of a primer, to adhere closely to various substrates, such as glass-, ceramic-material-, wood-, metal-, and resin-shaped products. The curable composition of the present invention is usable for interior panel adhesives, exterior panel adhesives, tiling adhesives, stone-material-laying adhesives, ceiling-finishing adhesives, floor-finishing adhesives, wall-finishing adhesives, vehicle-panel-usable adhesives, electrical/electronic/precision-instrument fabricating adhesives, adhesives for bonding a leather, a fiber product, a cloth, a paper piece, a plate and a rubber, reactive and post-crosslinkable pressure-sensitive adhesives, direct-grazing sealing materials, laminated-glass-usable sealing materials, sealing materials for an SSG construction method, sealing materials for working joints for buildings, and materials for civil engineering or bridges. Furthermore, the composition is usable as adhesive members, such as an adhesive tape and adhesive sheet.

EXAMPLES

Hereinafter, the method of the present invention will be specifically described by way of working examples thereof. However, the examples do not restrict the invention.

The average number of introduced carbon-carbon unsaturated bonds into a polymer (A) in each of the examples per terminal of the polymer (A) is calculated in accordance with the following calculation equation:

"Average number of the introduced bonds"=[(the iodine value of the polymer $(A)$)−(the iodine value of a precursor polymer $(P)$ thereof)]/[the hydroxyl value of the precursor polymer $(P)$]

Synthesis Example 1

A polyoxypropylene glycol having a number-average molecular weight of about 2,000 was used as an initiator to polymerize propylene oxide in the presence of a zinc hexacyanocobaltate glyme complex catalyst to yield a polyoxypropylene (P-1) having, at both terminals thereof, hydroxyl groups, respectively, and having a number-average molecular weight of 14,600. Subsequently, thereto was added a 28% solution of sodium methoxide in methanol in an amount of 1.0 equivalent by mole relative to the amount of the hydroxyl groups of this hydroxyl-group-terminated polyoxypropylene (P-1). Methanol was distilled off therefrom by vacuum devolatilization, and then allyl glycidyl ether was added to the polymer (P-1) in an amount of 1.0 equivalent by mole relative to the amount of the hydroxyl groups of the polymer (P-1) to conduct a reaction at 130° C. for 2 hours. Thereafter, thereto was added a solution of sodium methoxide in methanol in an amount of 0.28 equivalent by mole and methanol was removed. Furthermore, thereto was added 3-chloro-1-propene in an amount of 1.79 equivalents by mole to convert the hydroxyl groups at the terminals to allyl groups. An unreacted fraction of the allyl chloride was removed by vacuum devolatilization. Into 100 parts by weight of the resultant crude allyl-group-terminated polyoxypropylene were incorporated 300 parts by weight of n-hexane and 300 parts by weight of water, and the mixture was stirred. The reaction system was then centrifuged to remove water. Into the resultant hexane solution were further incorporated 300 parts by weight of water, and the mixture was stirred. The reaction system was again centrifuged to remove water, and then hexane was removed by vacuum devolatilization. The process gave a polyoxypropylene (A-1) having one or more terminal structures (each) having 2 or more carbon-carbon unsaturated bonds and having a number-average molecular weight of about 14,600. The number of introduced carbon-carbon unsaturated bonds on average per terminal of the polymer (A-1) was calculated. As a result, it was understood that about the polymer (A-1), the number of carbon-carbon unsaturated bonds introduced per terminal moiety of the polymer was 2.0 on average.

Synthesis Example 2

A polyoxypropylene glycol having a number-average molecular weight of about 2,000 was used as an initiator to polymerize propylene oxide in the presence of a zinc hexacyanocobaltate glyme complex catalyst to yield a polyoxypropylene (P-2) having, at both terminals thereof, hydroxyl groups, respectively, and having a number-average molecular weight of 28,500. Subsequently, thereto was added a 28% solution of sodium methoxide in methanol in an amount of 1.0 equivalent by mole relative to the amount of the hydroxyl groups of this hydroxyl-group-terminated polyoxypropylene (P-2). Methanol was distilled off therefrom by vacuum devolatilization, and then allyl glycidyl ether was added to the polymer (P-2) in an amount of 1.0 equivalent by mole relative to the amount of the hydroxyl groups of the polymer (P-2) to conduct a reaction at 130° C. for 2 hours. Thereafter, thereto was added a solution of sodium methoxide in methanol in an amount of 0.28 equivalent by mole and methanol was removed. Furthermore, thereto was added 3-chloro-1-propene in an amount of 1.79 equivalents by mole to convert the hydroxyl groups at the terminals to allyl groups. Thereafter, the same purifying operation as in Synthesis Example 1 was made. The process gave a polyoxypropylene (A-2) having one or more terminal structures (each) having 2 or more carbon-carbon unsaturated bonds and having a number-average molecular weight of about 28,500. It was understood that about the polymer (A-2), the number of carbon-carbon unsaturated bonds introduced per terminal moiety of the polymer was 2.0 on average.

Synthesis Example 3

To the hydroxyl-group-terminated polyoxypropylene (P-2) yielded according to Synthesis Example 2 was added a 28% solution of sodium methoxide in methanol in an amount of 1.0 equivalent by mole relative to the amount of the hydroxyl groups of the polymer (P-2). Methanol was distilled off therefrom by vacuum devolatilization, and then allyl glycidyl ether was added to the polymer (P-2) in an amount of 2.0 equivalents by mole relative to the amount of the hydroxyl groups of the polymer (P-2) to conduct a reaction at 130° C. for 2 hours. Thereafter, thereto was added a solution of sodium methoxide in methanol in an amount of 0.28 equivalent by mole and methanol was removed. Furthermore, thereto was added 3-chloro-1-propene in an amount of 1.79 equivalents by mole to convert the hydroxyl groups at the terminals to allyl groups. Thereafter, the same purifying operation as in Synthesis Example 1 was made. The process gave a polyoxypropylene (A-3) having one or more terminal structures (each) having 2 or more carbon-carbon unsaturated bonds and having a number-average molecular weight of about 28,500. It was understood that about the polymer (A-3), the number of the carbon-carbon unsaturated bonds introduced per terminal moiety of the polymer was 3.0 on average.

Synthesis Example 4

A polyoxypropylene glycol having a number-average molecular weight of about 2,000 was used as an initiator to polymerize propylene oxide in the presence of a zinc hexacyanocobaltate glyme complex catalyst to yield a polyoxypropylene (P-4) having, at both terminals thereof, hydroxyl groups, respectively, and having a number-average molecular weight of 25,500 (molecular weight in terms of that of polystyrene, measured using a system, HLC-8120 GPC, manufactured by Tosoh Corp. as a liquid sensing system, a column, TSK-GEL H type, manufactured by Tosoh Corp. as a column, and THF as a solvent). Subsequently, thereto was added a 28% solution of sodium methoxide in methanol in an amount of 1.0 equivalent by mole relative to the amount of the hydroxyl groups of this hydroxyl-group-terminated polyoxypropylene (P-4). Methanol was distilled off therefrom by vacuum devolatilization, and then allyl glycidyl ether was added to the polymer (P-4) in an amount of 1.0 equivalent by mole relative to the amount of the hydroxyl groups of the polymer (P-4) to conduct a reaction at 130° C. for 2 hours. Thereafter, thereto was added a solution of sodium methoxide in methanol in an amount of 0.28 equivalent by mole and methanol was removed. Furthermore, thereto was added 3-chloro-1-propene in an amount of 1.79 equivalents by mole to convert the hydroxyl groups at the terminals to allyl groups. An unreacted fraction of the allyl chloride was removed by vacuum devolatilization. Into 100 parts by weight of the resultant crude allyl-group-terminated polyoxypropylene were incorporated 300 parts by weight of n-hexane and 300 parts by weight of water, and the mixture was stirred. The reaction system was then centrifuged to remove water. Into the resultant hexane solution were further incorporated 300 parts by weight of water, and the mixture was stirred. The reaction system was again centrifuged to remove water, and then hexane was removed by vacuum devolatilization. The process gave a polyoxypropylene (A-4) having one or more terminal structures (each) having 2 or more carbon-carbon unsaturated bonds and having a number-average molecular weight of about 25,500. As a result, it was understood that about the polymer (A-4), the number of the carbon-carbon unsaturated bonds introduced per terminal moiety of the polymer was 2.0 on average.

Synthesis Example 5

A polyoxypropylene triol having a number-average molecular weight of about 3,000 was used as an initiator to polymerize propylene oxide in the presence of a zinc hexacyanocobaltate glyme complex catalyst to yield a polyoxypropylene (P-5) having, at three terminals thereof, hydroxyl groups, respectively, and having a number-average molecular weight of 26,200. Subsequently, thereto was added a 28% solution of sodium methoxide in methanol in an amount of 1.0 equivalent by mole relative to the amount of the hydroxyl groups of this hydroxyl-group-terminated polyoxypropylene (P-5). Methanol was distilled off therefrom by vacuum devolatilization, and then allyl glycidyl ether was added to the polymer (P-5) in an amount of 1.0 equivalent by mole relative to the amount of the hydroxyl groups of the polymer (P-5) to conduct a reaction at 130° C. for 2 hours. Thereafter, thereto was added a solution of sodium methoxide in methanol in an amount of 0.28 equivalent by mole and methanol was removed. Furthermore, thereto was added 3-chloro-1-propene in an amount of 1.79 equivalents by mole to convert the hydroxyl groups at the terminals to allyl groups. Thereafter, the same purifying operation as in Synthesis Example 1 was made. The process gave a polyoxypropylene (A-5) having one or more terminal structures (each) having 2 or more carbon-carbon unsaturated bonds and having a number-average molecular weight of about 26,200. It was understood that about the polymer (A-5), the number of the carbon-carbon unsaturated bonds introduced per terminal moiety of the polymer was 2.0 on average.

Synthesis Experimental Example 6

Butanol was used as an initiator to polymerize propylene oxide in the presence of a zinc hexacyanocobaltate glyme complex catalyst to yield a polyoxypropylene (P-6) having, at one of both terminals thereof, hydroxyl groups, and having a number-average molecular weight of 4900. Subsequently, thereto was added a 28% solution of sodium methoxide in methanol in an amount of 1.0 equivalent by mole relative to the amount of the hydroxyl groups of this hydroxyl-group-terminated polyoxypropylene (P-6). Methanol was distilled off therefrom by vacuum devolatilization, and then allyl glycidyl ether was added to the polymer (P-6) in an amount of 1.0 equivalent by mole relative to the amount of the hydroxyl groups of the polymer (P-6) to conduct a reaction at 130° C. for 2 hours. Thereafter, thereto was added a solution of sodium methoxide in methanol in an amount of 0.28 equivalent by mole and methanol was removed. Furthermore, thereto was added 3-chloro-1-propene in an amount of 1.79 equivalents by mole to convert the hydroxyl groups at the terminals to allyl groups. Thereafter, the same purifying operation as in Synthesis Example 1 was made. The process gave a polyoxypropylene (A-6) having one or more terminal structures (each) having 2 or more carbon-carbon unsaturated bonds and having a number-average molecular weight of about 4,900. It was understood that about the polymer (A-6), one of both the terminals was a butyloxy group, and the number of the carbon-carbon unsaturated bonds introduced into the other of the terminal moieties was 2.0 on average.

Synthesis Comparative Example 1

To the hydroxyl-group-terminated polyoxypropylene (P-1) yielded according to Synthesis Example 1 was added a 28% solution of sodium methoxide in methanol in an amount of 1.2 equivalents relative to the amount of the hydroxyl groups of the polymer (P-1). Methanol was distilled off therefrom by vacuum devolatilization, and then thereto was added 3-chloro-1-propene in an amount of 2.0 equivalents by mole relative to the amount of the hydroxyl groups of the polymer (P-1) to convert the hydroxyl groups at the terminals to allyl groups. Thereafter, the same purifying operation as in Synthesis Example 1 was made. The process gave a polyoxypropylene (P-1') having, at a or each terminal thereof, one carbon-carbon unsaturated bond and having a number-average molecular weight of about 14,600. It was understood that about the polymer (P-1'), the number of the carbon-carbon unsaturated bond(s) introduced per terminal moiety of the polymer was 1.0 on average.

Synthesis Comparative Example 2

To the hydroxyl-group-terminated polyoxypropylene (P-2) yielded according to Synthesis Example 2 was added a 28% solution of sodium methoxide in methanol in an amount of 1.2 equivalents relative to the amount of the hydroxyl groups of the polymer (P-2). Methanol was distilled off therefrom by vacuum devolatilization, and then thereto was added 3-chloro-1-propene in an amount of 2.0 equivalents by mole relative to the amount of the hydroxyl groups of the polymer (P-2) to convert the hydroxyl groups at the terminals to allyl groups. Thereafter, the same purifying operation as in Synthesis Example 1 was made. The process gave a polyoxypropylene (P-2') having, at a or each terminal thereof, one carbon-carbon unsaturated bond and having a number-average molecular weight of about 28,500. It was understood that about the polymer (P-2'), the number of the carbon-carbon unsaturated bond(s) introduced per terminal moiety of the polymer was 1.0 on average.

Synthesis Comparative Example 3

To the hydroxyl-group-terminated polyoxypropylene (P-4) yielded according to Synthesis Example 4 was added a 28% solution of sodium methoxide in methanol in an amount of 1.2 equivalents relative to the amount of the hydroxyl groups of the polymer (P-4). Methanol was distilled off therefrom by vacuum devolatilization, and then thereto was added 3-chloro-1-propene in an amount of 2.0 equivalents by mole relative to the amount of the hydroxyl groups of the polymer (P-4) to convert the hydroxyl groups at the terminals to allyl groups. Thereafter, the same purifying operation as in Synthesis Example 1 was made. The process gave a polyoxypropylene (P-4') having, at a or each terminal thereof, one carbon-carbon unsaturated bond and having a number-average molecular weight of about 25,500. It was understood that about the polymer (P-4'), the number of the carbon-carbon unsaturated bond(s) introduced per terminal moiety of the polymer was 1.0 on average.

Synthesis Comparative Example 4

To the hydroxyl-group-terminated polyoxypropylene (P-5) yielded according to Synthesis Example 5 was added a 28% solution of sodium methoxide in methanol in an amount of 1.2 equivalents relative to the amount of the hydroxyl groups of the polymer (P-5). Methanol was distilled off therefrom by vacuum devolatilization, and then thereto was added 3-chloro-1-propene in an amount of 2.0 equivalents by mole relative to the amount of the hydroxyl groups of the polymer (P-5) to convert the hydroxyl groups at the terminals to allyl groups. Thereafter, the same purifying operation as in Synthesis Example 1 was made. The process gave a polyoxypropylene (P-5') having, at a or each terminal thereof, one carbon-carbon unsaturated bond and having a number-average molecular weight of about 26,200. It was understood that about the polymer (P-5'), the number of the carbon-carbon unsaturated bond(s) per terminal moiety of the polymer was 1.0 on average.

Synthesis Comparative Example 5

To the hydroxyl-group-terminated polyoxypropylene (P-6) yielded according to Synthesis Example 6 was added a 28% solution of sodium methoxide in methanol in an amount of 1.2 equivalents relative to the amount of the hydroxyl groups of the polymer (P-6). Methanol was distilled off therefrom by vacuum devolatilization, and then thereto was added 3-chloro-1-propene in an amount of 2.0 equivalents by mole relative to the amount of the hydroxyl groups of the polymer (P-6) to convert the hydroxyl groups at the terminals to allyl groups. Thereafter, the same purifying operation as in Synthesis Example 1 was made. The process gave a polyoxypropylene (P-6') having, at a or each terminal thereof, one carbon-carbon unsaturated bond. It was understood that about the polymer (P-6'), one of both the terminals was a butyloxy group, and the number of the carbon-carbon unsaturated bond(s) introduced into the other of the terminal moieties was 1.0 on average.

Synthesis Example 7

To 500 g of the polymer (A-1) yielded according to Synthesis Example 1, which had two carbon-carbon unsaturated bonds on average per terminal moiety of the polymer, was added 50 µL of a platinum divinyldisiloxane complex solution (a solution of platinum in 2-propanol which had a platinum-converted concentration of 3% by weight). While this system was stirred, 18.2 g of dimethoxymethylsilane was dropwise and slowly added thereto. The resultant mixed solution was caused to undergo a reaction at 90° C. for 2 hours, and then an unreacted fraction of dimethoxymethylsilane was distilled off under a reduced pressure to yield a reactive-silicon-group-containing polyoxypropylene (B-1) having a number-average molecular weight of about 14,600 and having one or more terminal structures (each) having two or more dimethoxymethylsilyl groups. It was understood that the polymer (B-1) had dimethoxymethylsilyl groups that were 1.6 in number on average per terminal of the polymer, and had dimethoxymethylsilyl groups that were 3.2 in number on average per molecule of the polymer.

Synthesis Example 8

To 500 g of the polyoxypropylene (A-2) yielded according to Synthesis Example 2, which had two carbon-carbon unsaturated bonds on average per terminal moiety of the polymer, was added 50 µL of a platinum divinyldisiloxane complex solution. While this system was stirred, 9.6 g of dimethoxymethylsilane was dropwise and slowly added thereto. The resultant mixed solution was caused to undergo a reaction at 90° C. for 2 hours, and then an unreacted fraction of dimethoxymethylsilane was distilled off under a reduced pressure to yield a polyoxypropylene (B-2) having a number-average molecular weight of about 28,500 and having one or more terminal structures (each) having two or more dimethoxymethylsilyl groups. It was understood that the polymer (B-2) had dimethoxymethylsilyl groups that were 1.7 in number on average per terminal of the polymer, and had dimethoxymethylsilyl groups that were 3.4 in number on average per molecule of the polymer.

Synthesis Example 9

To 500 g of the polyoxypropylene (A-2), which had two carbon-carbon unsaturated bonds on average per terminal moiety of the polymer, was added 50 µL of a platinum divinyldisiloxane complex solution. While this system was stirred, 14.7 g of triethoxysilane was dropwise and slowly added thereto. The resultant mixed solution was caused to undergo a reaction at 90° C. for 2 hours, and then an unreacted fraction of triethoxysilane was distilled off under a reduced pressure to yield a polyoxypropylene (B-3) having a number-average molecular weight of about 28,500 and having one or more terminal structures (each) having two or more triethoxysilyl groups. It was understood that the polymer (B-3) had triethoxysilyl groups that were 1.7 in number on average per terminal of the polymer, and had triethoxysilyl groups that were 3.4 in number on average per molecule of the polymer.

Synthesis Comparative Example 6

To 500 g of the polymer (P-1') yielded in Synthesis Comparative Example 1 was added 50 µL of a platinum divinyldisiloxane complex solution. While this system was stirred, 8.9 g of dimethoxymethylsilane was dropwise and slowly added thereto. The resultant mixed solution was caused to undergo a reaction at 90° C. for 2 hours, and then an unreacted fraction of dimethoxymethylsilane was distilled off under a reduced pressure to yield a reactive-silicon-group-containing polyoxypropylene (S-1) having a number-average molecular weight of about 14,600 and having a or each terminal moiety having one dimethoxymethylsilyl group. It was understood that the polymer (S-1) had a dimethoxymethylsilyl group that was 0.75 in number on average per terminal of the polymer, and had dimethoxymethylsilyl groups that were 1.5 in number on average per molecule of the polymer.

Synthesis Comparative Example 7

To 500 g of the polymer (P-2') yielded in Synthesis Comparative Example 2 was added 50 µL of a platinum divinyldisiloxane complex solution. While this system was stirred, 4.8 g of dimethoxymethylsilane was dropwise and slowly added thereto. The resultant mixed solution was caused to undergo a reaction at 90° C. for 2 hours, and then an unreacted fraction of dimethoxymethylsilane was distilled off under a reduced pressure to yield a polyoxypropylene (S-2) having a number-average molecular weight of about 28,500 and having a or each terminal moiety having one dimethoxymethylsilyl group. It was understood that the polymer (S-2) had a dimethoxymethylsilyl group that was 0.8 in number on average per terminal of the polymer, and had dimethoxymethylsilyl groups that were 1.6 in number on average per molecule of the polymer.

Synthesis Comparative Example 8

To 500 g of the polymer (P-2') yielded in Synthesis Comparative Example 2 was added 50 µL of a platinum divinyldisiloxane complex solution. While this system was stirred, 7.4 g of triethoxysilane was dropwise and slowly added thereto. The resultant mixed solution was caused to undergo a reaction at 90° C. for 2 hours, and then an unreacted fraction of triethoxysilane was distilled off under a reduced pressure to yield a polyoxypropylene (S-3) having a number-average molecular weight of about 28,500 and having a or each terminal moiety having one triethoxysilyl group. It was understood that the polymer (S-3) had a triethoxysilyl group that was 0.8 in number on average per terminal of the polymer, and had triethoxysilyl groups that were 1.6 in number on average per molecule of the polymer.

Examples 1, 2 and 3, and Comparative Examples 1, 2 and 3

Into 100 parts by weight of a polymer shown in Table 1 (in each of these examples) were incorporated diisodecyl phthalate (manufactured by Kyowa Hakko Kogyo Co., Ltd., and referred to as DIDP hereinafter), 160 parts by weight of precipitated calcium carbonate (NEOLIGHT SP, manufactured by Takehara Kagaku Kogyo Co., Ltd.), 54 parts by weight of heavy calcium carbonate (WHITON SB, manufactured by Shiraishi Calcium Kaisha, Ltd.), 20 parts by weight of titanium oxide (TIPAQUE R820, manufactured by Ishihara Sangyo Kaisha, Ltd.), 2 parts by weight of an amide wax (CLAVERACK SL, manufactured by a company, Cleverley), 1 part by weight of 2-(3,5-di-tert-butyl-2-hydroxyphenyl)-5-chlorobenzotriazole (TINUVIN 327, manufactured by BASF Corp.), and 1 part by weight of bis(2,2,6,6-tetramethyl-4-pyperidyl) sebacate (SANOL LS770, manufactured by Ciba Specialty Chemicals Ltd.). A three-roll machine was used to disperse these components into an even state. Thereafter, thereto were added 3 parts by weight of vinyltrimethoxysilane (A-171, manufactured by Dow Corning Toray Co., Ltd.), 3 parts by weight of [3-(2-aminoethyl)aminopropyl]trimethoxysilane (KBM 603, manufactured by Shin-Etsu Chemical Co., Ltd.), and 2 parts by weight of dibutyltin bisacetyleacetonate (U-220H, manufactured by Nitto Kasei Co., Ltd.), and all the components were sufficiently mixed with each other with a spatula. An autorotation/orbital-revolution mixer was then used to mix the components with each other into an even state, and defoam the mixture. The composition was filled into a mold frame, and cured at 23° C. and 50% RH for 3 days, and further cured at 50° C. for 4 days to produce a sheet-form cured product having a thickness of about 3 mm. The sheet-form cured product was punched out into #3-dumbbell-form samples. One of the samples was subjected to a tensile strength test at 23° C. and 50% RH to measure the stress at 50% elongation, and the strength at breaking. The tensile strength was measured at a tensile rate of 200 mm/min., using an autograph (AGS-J) manufactured by Shimadzu Corp. Marked lines were drawn onto a necking region of another of the dumbbell-form cured products at intervals of 20 mm. The product was fixed in the state of being stretched to set each of the intervals between the marked lines to 40 mm, and then allowed to stand still at 23° C. and 50% RH for 24 hours. The fixation was then cancelled. After one hour, one day and one week from the cancellation, the respective recoveries were measured. The recoveries were each calculated in accordance with the following equation: the recovery (%)=(40−the distance (mm) between any two of the marked lines)/20. The results are shown in Table 1.

TABLE 1

| | | Example 1 | Example 2 | Example 3 | Comparative Example 1 | Comparative Example 2 |
|---|---|---|---|---|---|---|
| Polymer | | B-1 | B-2 | B-3 | S-1 | S-2 |
| Recovery | After one hour | B | B | A | D | D |
| | After one day | A | A | A | C | D |
| | After seven days | A | A | A | B | D |

As shown in Table 1, the respective compositions containing the polymers (B-1), (B-2), and (B-3) corresponding to the polymer (B) of the present invention each gave a cured product higher in hardness, strength and recovery than the respective compositions containing the polymers (S-1), (S-2) and (S-3), which were equal to the polymers (B-1) to (B-3) in main chain structure, molecular weight, and silicon group structure, respectively, but different therefrom in the number or quantity of the terminated silicon groups introduced.

Synthesis Example 10

To 500 g of the polymer (A-4) yielded according to Synthesis Example 4 was added 50 µL of a solution of a platinum divinyldisiloxane complex. While the reaction system was stirred, thereto was dropwise and slowly added 11.2 g of trimethoxysilane. The mixed solution was caused to undergo a reaction at 90° C. for 2 hours, and then an unreacted fraction of trimethoxysilane was distilled off under a reduced pressure to yield a reactive-silicon-group-containing polyoxypropylene (B-4) having a number-average molecular weight of about 25,500 and having one or more terminal structures (each) having two or more trimethoxysilyl groups. It was understood that the polymer (B-4) had dimethoxymethylsilyl groups that were 1.6 in number on average per terminal of the polymer, and had dimethoxymethylsilyl groups that were 3.2 in number on average per molecule of the polymer.

Synthesis Example 11

Over 4 hours, to 200 g of isobutyl alcohol (IBA) heated to 105° C. was dropwise added a solution obtained by dissolving 11.5 g of azobis-2-methylbutyronitrile as a polymerization initiator into a mixture composed of 300 g of methyl methacrylate, 115 g of 2-ethylhexyl acrylate, 46 g of γ-methacryloxypropyltrimethoxysilane, 37 g of γ-mercaptopropyltrimethoxysilane, and 140 g of IBA. Thereafter, the polymerizable components therein were polymerized to yield a (meth)acrylate copolymer (C-1) having a solid concentration of 60% and a number-average molecular weight of 2,200, and having trimethoxysilyl groups which were 1.5 in number on average per molecule of the polymer.

Synthesis Example 12

The methacrylate copolymer (C-1) solution yielded according to Synthesis Example 11 was mixed with 60 parts of the reactive-silicon-group-containing polyoxypropylene (B-4) into an even state to adjust the polymer (C-1) solid content in the solution into 40 parts. Therefrom, isobutyl alcohol was distilled off through a rotary evaporator to yield a polymer mixture (BC-4).

Synthesis Comparative Example 9

To 500 g of the polymer (P-2') yielded in Synthesis Comparative Example 2 was added 50 µL of a solution of a platinum divinyldisiloxane complex. While the reaction system was stirred, thereto was dropwise and slowly added 5.5 g of trimethoxysilane. The mixed solution was caused to undergo a reaction at 90° C. for 2 hours, and then an unreacted fraction of trimethoxysilane was distilled off under a reduced pressure to yield a reactive-silicon-group-containing polyoxypropylene (S-4) having a number-average molecular weight of about 28,500 and having, at a or each terminal, one trimethoxysilyl group. It was understood that the polymer (S-4) had a trimethoxysilyl group that was 0.8 in number on average per terminal of the polymer, and had trimethoxysilyl groups that were 1.6 in number on average per molecule of the polymer.

Synthesis Comparative Example 10

The methacrylate copolymer (C-1) solution yielded according to Synthesis Example 11 was mixed with 60 parts of the reactive-silyl-group-containing polyoxypropylene (S-4) into an even state to adjust the polymer (C-1) solid content in the solution into 40 parts. Therefrom, isobutyl alcohol was distilled off through a rotary evaporator to yield a polymer mixture (SC-4).

Example 4 and Comparative Example 4

Into 100 parts by weight of each of the polymer (BC-4) and the polymer (SC-4) were incorporated 3.0 parts by weight of tin octylate, 0.5 part by weight of laurylamine, and 0.6 part by weight of water into an even state while the polymer was stirred. The resultant was centrifuged to be defoamed. The resultant mixture was filled into a mold frame made of polyethylene not to put air bubbles into the frame. The mixture was cured at 23° C. and 50% RH for 1 hour and further cured at 70° C. for 20 hours to produce a sheet having a thickness of about 3 mm. The sheet was punched out into #3-dumbbell-form samples. One of the samples was subjected to a tensile strength test at 23° C. and 50% RH to measure the stress at 50% elongation (M50), the strength at breaking (TB), and the elongation at breaking (EB). The tensile strength was measured at a tensile rate of 200 mm/min., using an autograph (AGS-J) manufactured by Shimadzu Corp. The results are shown in Table 2.

TABLE 2

| | Polymer | Example 4 BC-4 | Comparative Example 4 SC-4 |
|---|---|---|---|
| Cured product physical properties | M50 (MPa) | 0.8 | 0.9 |
| | TB (MPa) | 8.6 | 4.9 |
| | EB (%) | 120 | 110 |

It is understood that when the polymer (B-4) having one or more terminal structures (each) having two or more reactive silicon groups is compared with the polymer (S-4) having, at a or each terminal, one reactive silicon group, the strength of the cured product made of the polymer (C-1) combined with the mixture (BC-4) is drastically high.

Synthesis Example 13

To 500 g of the polyoxypropylene (A-3) yielded according to Synthesis Example 3, which had ally groups that were 3 in number on average per terminal of the polymer, was added 50 µL of a solution of a platinum divinyldisiloxane complex. While the reaction system was stirred, thereto was dropwise and slowly added 12.8 g of dimethoxymethylsilane. The mixed solution was caused to undergo a reaction at 90° C. for 2 hours, and then an unreacted fraction of dimethoxymethylsilane was distilled off under a reduced pressure to yield a polyoxypropylene (B-5) having a number-average molecular weight of about 28,500 and having one or more terminal structures (each) having two or more dimethoxymethylsilyl groups. It was understood that the polymer (B-5) had dimethoxymethylsilyl groups that were 2.4 in number on average per terminal of the polymer, and had dimethoxymethylsilyl groups that were 4.8 in number on average per molecule of the polymer.

Synthesis Example 14

The same operations as in Synthesis Example 13 were made except that 12.8 g of dimethoxymethylsilane was changed to 14.7 g of trimethoxysilane, so as to yield a polyoxypropylene (B-6) having one or more terminal structures (each) having two or more reactive silicon groups. It was understood that the polymer B-6 had dimethoxymethylsilyl groups that were 2.4 in number on average per terminal of the polymer, and had dimethoxymethylsilyl groups that were 4.8 in number on average per molecule of the polymer.

Synthesis Example 15

The same operations as in Synthesis Example 13 were made except that 12.8 g of dimethoxymethylsilane was changed to 6.4 g of dimethoxymethylsilane and 7.4 g of trimethoxysilane, so as to yield a polyoxypropylene (B-7) having a number-average molecular weight of about 28,500 and having one or more terminal structures (each) having two or more reactive silicon groups. It was understood that the polymer (B-7) had dimethoxymethylsilyl groups and trimethoxysilyl groups that were 1.2 and 1.2, respectively, in number on average per terminal of the polymer, and had the reactive silicon groups that were 4.8 in number on average per molecule of the polymer.

Synthesis Example 16

The same operations as in Synthesis Example 12 were made except that the polymer (B-4) was changed to the polymer (B-5), so as to yield a polymer mixture (BC-5).

Synthesis Example 17

The same operations as in Synthesis Example 12 were made except that the polymer (B-4) was changed to the polymer (B-6), so as to yield a polymer mixture (BC-6).

Synthesis Example 18

The same operations as in Synthesis Example 12 were made except that the polymer (B-4) was changed to the polymer (B-7), so as to yield a polymer mixture (BC-7).

Synthesis Comparative Example 11

The same operations as in Synthesis Comparative Example 10 were made except that the polymer (S-4) was changed to the polymer (S-2), so as to yield a polymer mixture (SC-2).

Examples 5 and 6 and Comparative Example 5

Using the polymer or a combination of the polymers in Table 3 (in each of the examples), a cured product was produced in the same way as in Example 1. Tensile properties thereof were evaluated. The results are shown in Table 3.

TABLE 3

| Polymer (composition ratio) | | Example 5 | Example 6 | Comparative Example 5 |
|---|---|---|---|---|
| BC-5 | | 50 | | |
| BC-6 | | 50 | | |
| BC-7 | | | 100 | |
| SC-2 | | | | 50 |
| SC-4 | | | | 50 |
| M50 | MPa | 1.6 | 1.3 | 1.0 |
| M100 | MPa | 11.1 | 11.0 | — |
| TB | MPa | 11.8 | 11.0 | 5.2 |
| EB | % | 100 | 100 | 95 |

The respective polymers contained in the curable compositions of the working examples are each a polymer mixture of a polyoxyalkylene containing reactive silicon groups that are two in number on average per terminal of the polymer, and containing, as the reactive silicon groups, both of trimethoxysilyl and dimethoxymethylsilyl groups, and a reactive-silicon-group-containing (meth)acrylate copolymer (C). It is understood that the polymers give respective cured products higher in hardness and strength than the polymers of the corresponding comparative examples.

Synthesis Comparative Example 12

To the hydroxyl-group-terminated polyoxypropylene (P-6) yielded according to Synthesis Example 6 was added a 28% solution of sodium methoxide in methanol in an amount of 1.2 equivalents by mole relative to the amount of the hydroxyl groups of the polymer (P-6). Methanol was distilled off therefrom by vacuum devolatilization, and then thereto was added 3-chloro-1-propene in an amount of 2.0 equivalents by mole relative to the amount of the hydroxyl groups of the polymer (P-6) to convert the hydroxyl groups at the terminals to allyl groups. Thereafter, the same purifying operation as in Synthesis Example 1 was made. The process gave a polyoxypropylene polymer having, at one of both terminals thereof, an allyl group. To 500 g of this polymer was added 50 µL of a solution of a platinum divinyldisiloxane complex. While the reaction system was stirred, thereto was dropwise and slowly added 35.3 g of dimethoxymethylsilane. The mixed solution was caused to undergo a reaction at 90° C. for 2 hours, and then an unreacted fraction of dimethoxymethylsilane was distilled off under a reduced pressure to yield a polyoxypropylene (D-1) having, at a or each terminal thereof, one dimethoxymethylsilyl group. It was understood that the polymer (D-1) had a dimethoxymethylsilyl group that was 0.8 in number on average per molecule of the polymer.

Examples 7 to 9

Into 100 parts by weight of a polymer or a combination of polymers shown in Table 4 (in each of examples) were incorporated 65 parts by weight of polypropylene glycol (ACTCOL 21-56, manufactured by Mitsui Chemicals, Inc.), 30 parts by weight of precipitated calcium carbonate (HAKUENKA CCR, manufactured by Shiraishi Calcium Kaisha, Ltd.), and 70 parts by weight of the carbonate (WHITON SB). A three-roll machine was used to disperse these components into an even state. However, in Example 9, 80 parts by weight of the polymer (B-1) and 20 parts by weight of the plasticizer DIDP were combined with each other into 100 parts by weight. Thereafter, thereto were added 3 parts by weight of the product A-171, 4 parts by weight of that KBM 603, and 1 part by weight of that U-220H, and all the components were sufficiently mixed with each other with a spatula. An autorotation/orbital-revolution mixer was then used to mix the components with each other into an even state, and defoam the mixture. The resultant composition was filled into a mold frame, and cured at 23° C. and 50% RH for 3 days, and further cured at 50° C. for 4 days to produce a sheet-form cured product having a thickness of about 3 mm. In the same way as in Example 1, the cured product was measured about the modulus at 50% elongation, and the strength at breaking. Moreover, an evaluating fraction of the composition was filled into a mold frame having a thickness of about 5 mm, using a spatula. The time when the surface thereof had been adjusted into a flat form was defined as the curing start time (of the composition). The surface was touched with a spatula. The time when the composition had come not to adhere onto the spatula was defined as the skinning time. Thus, the period for the curing was measured. Just after the mixing in the mixer, a BM type viscometer (using a rotor No. 4) was used to measure the viscosity of the composition. The results are shown in Table 4.

TABLE 4

| Polymer (composition ratio) | | Example 7 | Example 8 | Example 9 |
|---|---|---|---|---|
| B-1 | | 80 | 100 | 80 |
| D-1 | | 20 | | |
| DIDP (plasticizer) | | | | 20 |
| Viscosity | Pa-s/2 rpm | 22 | 31 | 24 |
| Skinning period | min | 55 | 40 | 60 |
| Cured product physical properties | M50 (MPa) | 0.3 | 0.5 | 0.3 |
| | TB (MPa) | 1.1 | 1.0 | 0.9 |
| | EB (%) | 220 | 110 | 160 |

It is understood that the use of the polymers (B-1) and (D-1) together makes it possible to make the curable composition lower in viscosity and make the resultant cured product higher in elongation without lowering the breaking strength thereof than the use of the polymer (B-1) alone.

Synthesis Example 19

To 500 g of the polymer (A-2) yielded according to Synthesis Example 2 were added 10 g of trimethyl orthoacetate and 50 µL of a solution of a platinum divinyldisiloxane complex. While the reaction system was stirred, thereto was dropwise and slowly added 10.3 g of trimethoxysilane. The mixed solution was caused to undergo a reaction at 90° C. for 2 hours, and then an unreacted fraction of trimethoxysilane was distilled off under a reduced pressure to yield a polyoxypropylene (B-8) having a number-average molecular weight of about 28,500 and having one or more terminal structures (each) having two or more trimethoxysilyl groups. It was understood that the polymer (B-8) had trimethoxysilyl groups that were 1.6 in number on average per terminal of the polymer, and had trimethoxysilyl groups that were 3.2 in number on average per molecule of the polymer.

Synthesis Example 20

The same operations as in Synthesis Example 12 were made except that the polymer (B-4) was changed to the polymer (B-8), so as to yield a polymer mixture (BC-8).

Synthesis Comparative Example 13

To 500 g of the polymer (P-5') yielded in Synthesis Comparative Example 4 was added 50 µL of a platinum divinyldisiloxane complex solution. While this system was stirred, 6.3 g of trimethoxysilane was dropwise and slowly added thereto. The resultant mixed solution was caused to undergo a reaction at 90° C. for 2 hours, and then an unreacted fraction of trimethoxysilane was distilled off under a reduced pressure to yield a polyoxypropylene (S-5) having a number-average molecular weight of about 26,200 and having, at a or each terminal thereof, one trimethoxysilyl group. It was understood that the polymer (S-5) had a trimethoxysilyl group that was 0.7 in number on average per terminal of the polymer, and had trimethoxysilyl groups that were 2.0 in number on average per molecule of the polymer.

Synthesis Comparative Example 14

The same operations as in Synthesis Comparative Example 10 were made except that the polymer (S-4) was changed to the polymer (S-5), so as to yield a polymer mixture (SC-5).

Examples 10 and 11 and Comparative Examples 6 and 7

In accordance with a composition as shown in Table 5 (in each of these examples), 100 parts by weight of the polymer (B-2), (BC-8), (S-2) or (SC-5) were mixed with 10 or 20 parts by weight of a DT resin, i.e., a methylsilicone oligomer having, in a single molecule thereof, 14% by weight of silicon-atom-bonded methoxy groups (XR31-B2733, manufactured by Momentive Performance Materials Japan LLC), and 1 part by weight of dibutyltin bisacetylacetonate. The mixture was centrifuged to be defoamed, and then filled into a mold frame made of polyethylene not to put air bubbles into the frame. The mixture was cured at 23° C. and 50% RH for 3 days and further cured at 50° C. for 4 days to produce a sheet-form cured product having a thickness of 3 mm. The sheet was punched out into #3-dumbbell-form samples. In the same way as in Example 1, the samples were measured about the stress at 50% elongation (M50), the stress at 100% elongation (M100), and the strength at breaking (TB) and the elongation at breaking (EB) thereof. The results are shown in Table 5.

TABLE 5

| Polymer (composition ratio) | Example 10 | Example 11 | Comparative Example 6 | Comparative Example 7 |
|---|---|---|---|---|
| B-2 | 100 | | | |
| BC-8 | | 100 | | |
| S-2 | | | 100 | |
| SC-5 | | | | 100 |
| XR31-B2733 | 10 | 20 | 10 | 20 |
| M50 (MPa) | 0.5 | 3.1 | 0.3 | 2.0 |
| M100 (MPa) | 0.7 | — | 0.4 | — |
| TB (MPa) | 0.8 | 10.8 | 0.7 | 4.9 |
| EB (%) | 130 | 90 | 220 | 80 |

It is understood that a combination of a curable composition containing the polymer (B) of the present invention with a methylsilicone makes it possible to yield a cured product having a higher breaking strength than a curable composition containing the polymer (S-2) or the polymer mixture (SC-5) of the corresponding comparative example.

Synthesis Comparative Example 15

To the hydroxyl-group-terminated polyoxyalkylene (P-2) yielded in Synthesis Example 2 was added a 28% solution of sodium methoxide in methanol in an amount of 1.2 equivalents by mole relative to the amount of the hydroxyl groups of this polymer (P-2). Methanol was distilled off therefrom by vacuum devolatilization, and then to the polymer was added 3-chloro-2-methyl-1-propene in an amount of 1.5 equivalents by mole relative to the amount of the hydroxyl groups of the polymer (P-2) to convert the hydroxyl groups at the terminals to methallyl groups. An unreacted fraction of 3-chloro-2-methyl-1-propene was removed by reduced-pressure devolatilization. Into 100 parts by weight of the resultant crude methallyl-group-terminated polyoxypropylene were incorporated 300 parts by weight of n-hexane and 300 parts by weight of water, and the mixture was stirred. The reaction system was then centrifuged to remove water. Into the resultant hexane solution were further incorporated 300 parts by weight of water, and the mixture was stirred. The reaction system was again centrifuged to remove water, and then hexane was removed by reduced-pressure devolatilization. The process gave a polyoxypropylene polymer (P-7) having, at a or each terminal moiety, a methallyl group. To 500 g of this polymer (P-7) was added 150 µL of a platinum divinyldisiloxane complex solution. While this system was stirred, 12.0 g of dimethoxymethylsilane was dropwise and slowly added thereto. This mixed solution was caused to undergo a reaction at 100° C. under a 6%-oxygen condition for 6 hours, and then an unreacted fraction of dimethoxymethylsilane was distilled off under a reduced pressure to yield a polyoxypropylene (S-6) having a number-average molecular weight of about 28,500 and having, at a or each terminal thereof, one dimethoxymethylsilyl group. It was understood that the polymer (S-6) had a dimethoxymethylsilyl group that was 1.0 in number on average per terminal of the polymer, and had dimethoxymethylsilyl groups that were 2.0 in number on average per molecule of the polymer.

Examples 12 to 14, and Comparative Examples 8 to 12

Into 100 parts by weight of a reactive-silicon-group-containing polymer shown in Table 6 (in each of these examples) were incorporated 55 parts by weight of DIDP, 120 parts by weight of the carbonate CCR, 20 parts by weight of the product TIPAQUE R820, 2 parts by weight of an aliphatic acid amide wax (DISPARLON 6500, manufactured by Kusumoto Chemicals, Ltd.), 1 part by weight of the product TINUVIN 327, and 1 part by weight of the product SANOL LS770. A three-paint-roll machine was used to disperse these components into an even state. Thereafter, thereto were added 2 parts by weight of the product A-171, 3 to 7 parts by weight of that KBM 603, and 2 parts by weight of that NEOSTANNU-220H, and all the components were sufficiently mixed with each other. An autorotation/orbital-revolution mixer was then used to mix the components with each other into an even state, and defoam the mixture. The resultant composition was filled into a mold frame having a thickness of about 5 mm, using a spatula. The time when the surface thereof had been adjusted into a flat form was defined as the curing start time, and the period for curing the surface was measured. The surface was touched with a spatula at intervals of 1 minute until 10 minutes elapsed from the start, at intervals of 5 minutes until 60 minutes elapsed therefrom, and at intervals of 10 minutes thereafter. The time when the composition had come not to adhere onto the spatula was defined as the skinning time. Thus, the period for the curing was measured. Furthermore, the composition was painted into the form of beads onto each of an aluminum substrate and a soft polyvinyl chloride substrate. The resultant was cured at 23° C. and 50% RH in a thermostat for 7 days. The resultant bonding-test piece was used to check the state of the bonded surface when the bonded surface was broken in a 90-degree hand peel test. The proportion of cohesive failure is represented by C; and that of interfacial peeling, by A. The results are shown in Table 6. In Table 6 are shown the species of the polymer, and the proportion of the product KBM 603. The other components are common between the present examples.

TABLE 6

|  |  | Example 12 | Example 13 | Example 14 | Comparative Example 8 | Comparative Example 9 | Comparative Example 10 | Comparative Example 11 | Comparative Example 12 |
|---|---|---|---|---|---|---|---|---|---|
| Polymer | | B-2 | B-2 | B-2 | S-2 | S-2 | S-6 | S-6 | S-6 |
| KBM 603 (parts by weight) | | 3 | 5 | 7 | 3 | 5 | 3 | 5 | 7 |
| Skinning period | min. | 55 | 45 | 35 | 45 | 35 | 80 | 70 | 55 |
| Adhesiveness | Aluminum plate | C100 | C100 | C100 | C100 | C100 | C100 | C100 | C100 |
| 90° Hand peel test | Soft polyvinyl chloride | A100 | C100 | C100 | A100 | A100 | A100 | A100 | A100 |

From the results in Table 6, it is understood that in a curable composition using the polymer (B) of the present invention, it is effective for an improvement in the adhesiveness thereof to increase the proportion of the amount of an aminosilane.

Example 15 and Comparative Example 13

Into 100 parts by weight of a reactive-silicon-group-containing polymer shown in Table 7 (in each of these examples) were incorporated 55 parts by weight of DIDP, 120 parts by weight of the carbonate CCR, 20 parts by weight of the product TIPAQUE 8820, 2 parts by weight of the wax DISPARLON 6500, 1 part by weight of the product TINUVIN 327, and 1 part by weight of the product SANOL LS770. A three-paint-roll machine was used to disperse these components into an even state. Thereafter, thereto were added 2 parts by weight of the product A-171, 3 parts by weight of that KBM 603, and 2 parts by weight of that NEOSTANN U-220H, and all the components were sufficiently mixed with each other. An autorotation/orbital-revolution mixer was then used to mix the components with each other into an even state, and defoam the mixture. In the same way as in Example 1, a sheet-form cured product having a thickness of about 3 mm was produced therefrom. Thereafter, this sheet was set into a sunshine carbon arc lamp type accelerating weather resistance test machine (model number: S80, manufactured by Suga Test Instrument Co., Ltd.), which is an accelerating weather resistance test machine. A weather resistance test was made under conditions that the temperature of its black panel was 63° C., the temperature was 50° C. and the water-spraying period per 120 minutes was 18 minutes. Using such a criterion that the quantity (Q value) and the size (S value) of cracks are each expressed in a numerical form, which is prescribed in the ISO standard, the value of the product of the Q value and the S value was defined as the QS value, which is a scale representing the deterioration degree of the surface. The surface state of the sheet was quantitatively represented after each of periods of 600 hours and 1300 hours. The results are shown in Table 7. A case where the QS value was 0 is represented by A; a case where the value was 10 or less, by B; and a case where the value was 20 or less, by C.

TABLE 7

|  |  | Example 15 | Comparative Example 13 |
|---|---|---|---|
| Polymer | | B-1 | S-1 |
| Accelerated weather resistance | 600 h | A | B |
| | 1300 h | A | C |

From a comparison of Example 15 with Comparative Example 13, it is understood that the polymer (B-1) of the present invention is lower in QS value to be better in weather resistance than the polymer (S-1).

INDUSTRIAL APPLICABILITY

The polymer and the composition (of any one of the aspects) of the present invention are each suitable for being used as a curable composition or an adhesive composition, and are each usable for a sticker, a sealing material for buildings, ships, automobiles, roads or others, an adhesive, a waterproof material, a painted film waterproof material, a mold making agent, a vibration proof material, a damping material, a soundproof material, a foaming material, a paint, a spraying material, and others. A cured product obtained by curing the curable composition of the present invention is excellent in softness and adhesiveness, and thus the product is more preferably used as a sealing material or adhesive out of the above-mentioned articles.

The polymer or the composition of the present inventions is usable for various articles, such as electrical/electronic part materials such as a solar battery rear-surface sealing material, electrical/electronic parts such as an insulating coat material for electric wires/cables, electrically insulating materials for devices, acoustic insulating materials, elastic adhesives, binders, contact-type adhesives, spraying-type sealing materials, crack repairing materials, adhesives for tiling, adhesives for asphalt waterproof materials, powder paints, casting materials, rubbery materials for medical care, stickers for medical care, adhesive sheets for medical care, medical machine sealing materials, dental impression materials, food wrapping materials, sealing materials for joints between exterior members such as sizing boards, coating materials, slip-preventing coating materials, buffer materials, primers, electromagnetic wave shielding electroconductive materials, thermoconductive materials, hot melt materials, electrical/electronic potting agents, films, gaskets, concrete reinforcing materials, adhesives for pre-adhesion, various molding materials, antirust and waterproof sealing materials for end surfaces (cut regions) of a wire-reinforced glass piece or laminated glass piece, and liquid sealing agents used for automobile parts, parts of large vehicles such as trucks and buses, train vehicle parts, aircraft parts, ship parts, electrical machinery parts, and various mechanical parts, and others. When automobiles are given as an example, the polymer or the composition is usable for various purposes, such as the attachment of plastic covers, trims, flanges, bumpers or windows, and the bonding and attachment of interior parts or exterior parts. The polymer or the composition is also usable as various sealing compositions and bonding compositions since the polymer or the composition can be caused, by itself or by aid of a primer, to adhere closely to various substrates, such as glass-, ceramic-material-, wood-, metal-, and resin-shaped products. The polymer or the curable composition of the present invention is usable for interior panel adhesives, exterior panel adhesives, tiling adhesives, stone-material-laying adhesives, ceiling-finishing adhesives, floor-finishing adhesives, wall-finishing adhesives, vehicle-panel-usable adhesives, electrical/electronic/precision-instrument fabricating adhesives, adhesives for bonding a leather, a fiber product, a cloth, a paper piece, a plate and a rubber, reactive and post-crosslinkable pressure-sensitive adhesives, direct-grazing sealing materials, laminated-glass-usable sealing materials, sealing materials for an SSG construction method, sealing materials for working joints for buildings, and materials for civil engineering or bridges. Furthermore, the polymer or the composition is usable as adhesive members, such as an adhesive tape and adhesive sheet.

The invention claimed is:

1. A reactive-silicon-group-containing polymer (B) having, at one terminal moiety thereof, a terminal structure having two or more reactive silicon groups, wherein the reactive-silicon-group-containing polymer (B) is represented by formula (5),

[Formula 6]

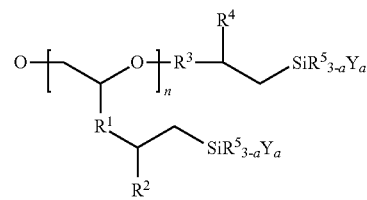

(5)

wherein $R^1$ and $R^3$ are each independently a bivalent bonding group having 1 to 6 carbon atoms and an atom of the bonding group that is bonded to any carbon atom adjacent to the bonding group is any one of carbon, oxygen and nitrogen; $R^2$ and $R^4$ are each independently hydrogen, or a hydrocarbon group having 1 to 10 carbon atoms; and n is an integer of 1 to 10; $R^5$(s) is/are (each independently) a substituted or unsubstituted hydrocarbon group having 1 to 20 carbon atoms, Y is a hydroxyl group or a hydrolyzable group, and a is 1, 2 or 3; and the reactive-silicon-group-containing polymer (B) is reactive-silicon-group-containing polyoxyalkylene polymer (B).

2. The reactive-silicon-group-containing polymer (B) of claim 1, having reactive silicon groups which are 1.1 or more in number on average per terminal of the polymer.

3. The reactive-silicon-group-containing polymer (B) of claim 1, obtained by introducing one or more reactive silicon groups into unsaturated bonds of the polymer (A) according to claim 1 by hydrosilylation reaction.

4. The method for manufacturing a reactive-silicon-group-containing polymer (B) of claim 1, comprising: introducing one or more reactive silicon groups into unsaturated bonds of the polymer (A) according to claim 1 by hydrosilylation reaction.

* * * * *